US011179791B2

(12) United States Patent
Matsuzaki et al.

(10) Patent No.: US 11,179,791 B2
(45) Date of Patent: Nov. 23, 2021

(54) COMPOSITE SOLDERING, DE-SOLDERING STATION AND SYSTEM

(71) Applicant: Hakko Corporation, Osaka (JP)

(72) Inventors: Kenji Matsuzaki, Osaka (JP); Hitoshi Takeuchi, Osaka (JP); Kenta Nakamura, Osaka (JP)

(73) Assignee: Hakko Corporation

( * ) Notice: Subject to any disclaimer, the term of this patent is extended or adjusted under 35 U.S.C. 154(b) by 296 days.

(21) Appl. No.: 16/058,319

(22) Filed: Aug. 8, 2018

(65) Prior Publication Data

US 2019/0047066 A1 Feb. 14, 2019

Related U.S. Application Data

(60) Provisional application No. 62/543,797, filed on Aug. 10, 2017.

(51) Int. Cl.
*B23K 3/03* (2006.01)
*B23K 1/018* (2006.01)
*G06F 13/42* (2006.01)
*B23K 3/02* (2006.01)

(52) U.S. Cl.
CPC .............. *B23K 3/033* (2013.01); *B23K 1/018* (2013.01); *B23K 3/028* (2013.01); *B23K 3/0346* (2013.01); *G06F 13/4282* (2013.01)

(58) Field of Classification Search
CPC .... B23K 3/033; B23K 3/0346; B23K 3/0478; B23K 3/028; B23K 3/03; B23K 3/02; B23K 1/018
See application file for complete search history.

(56) References Cited

U.S. PATENT DOCUMENTS

| | | | |
|---|---|---|---|
| 5,014,210 A | 5/1991 | Postlewait | |
| 5,130,640 A * | 7/1992 | Gambill | B23K 3/033 |
| | | | 324/510 |
| 5,495,093 A * | 2/1996 | Griffith | B23K 3/033 |
| | | | 219/233 |
| 6,563,087 B1 * | 5/2003 | Yokoyama | B23K 3/03 |
| | | | 219/240 |
| 2010/0022269 A1 * | 1/2010 | Terlizzi | H04M 1/05 |
| | | | 455/556.1 |
| 2015/0246404 A1 * | 9/2015 | Teraoka | G05B 15/02 |
| | | | 219/129 |
| 2016/0354855 A1 * | 12/2016 | Ulrich | B23K 9/1006 |
| 2017/0173719 A1 * | 6/2017 | Nguyen | B23K 3/0353 |
| 2018/0001567 A1 * | 1/2018 | Juan | B29C 64/255 |

FOREIGN PATENT DOCUMENTS

| | | |
|---|---|---|
| CN | 105729475 A | 7/2016 |
| CN | 205519983 U | 8/2016 |
| JP | A2008-254057 | 10/2008 |
| JP | 2015039750 | 2/2015 |
| JP | 2015160245 | 7/2015 |
| WO | WO2008/139623 | 12/2010 |

* cited by examiner

*Primary Examiner* — John J Norton
(74) *Attorney, Agent, or Firm* — David B Abel

(57) ABSTRACT

A soldering and de-soldering station and systems including enhanced features for the soldering heating tools, load detection functionality, tip management, automatic tip temperature calibration, cartridge/handle position and movement sensing and interactive capabilities.

22 Claims, 16 Drawing Sheets

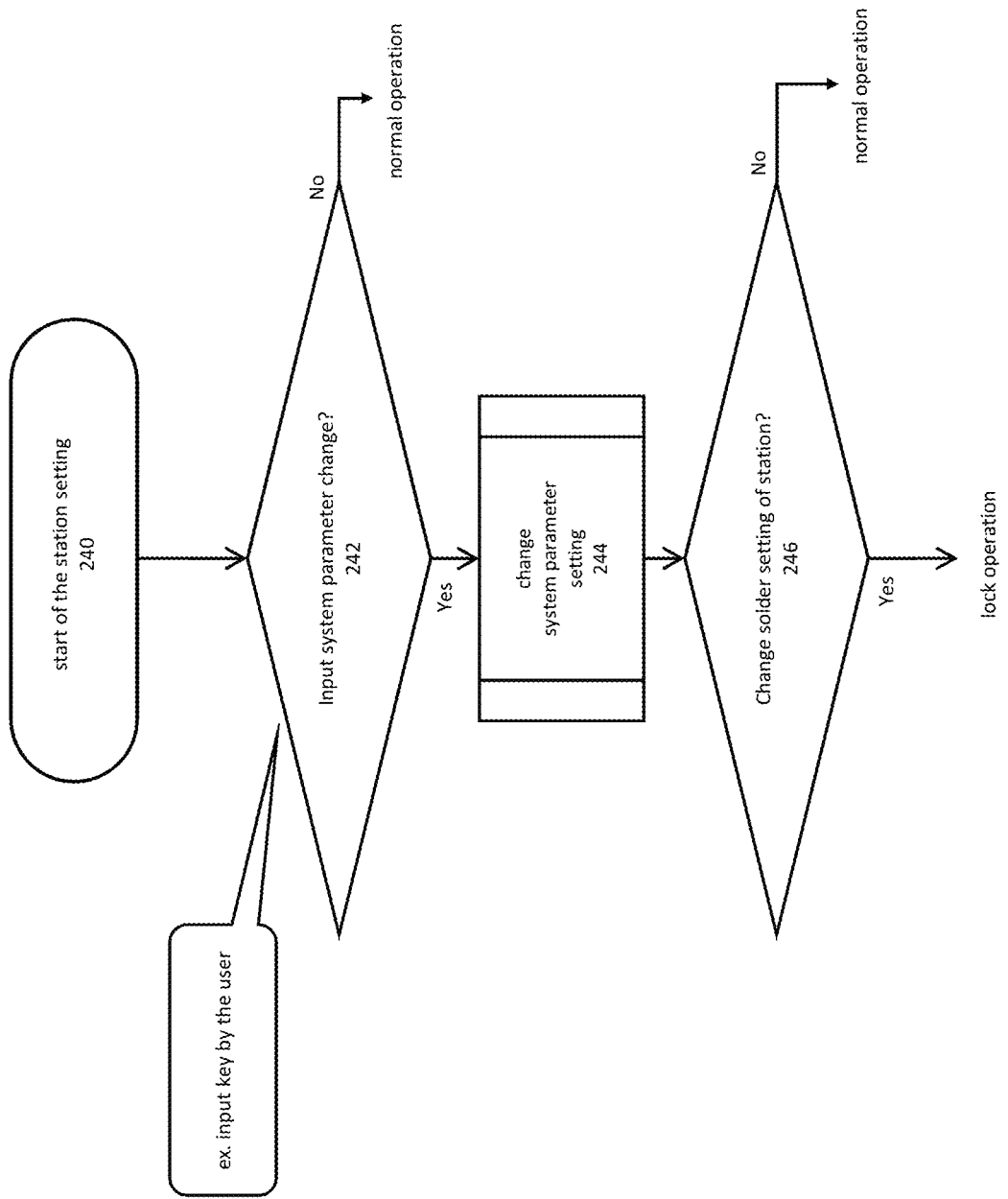
Fig.5B Solder setting (Station)

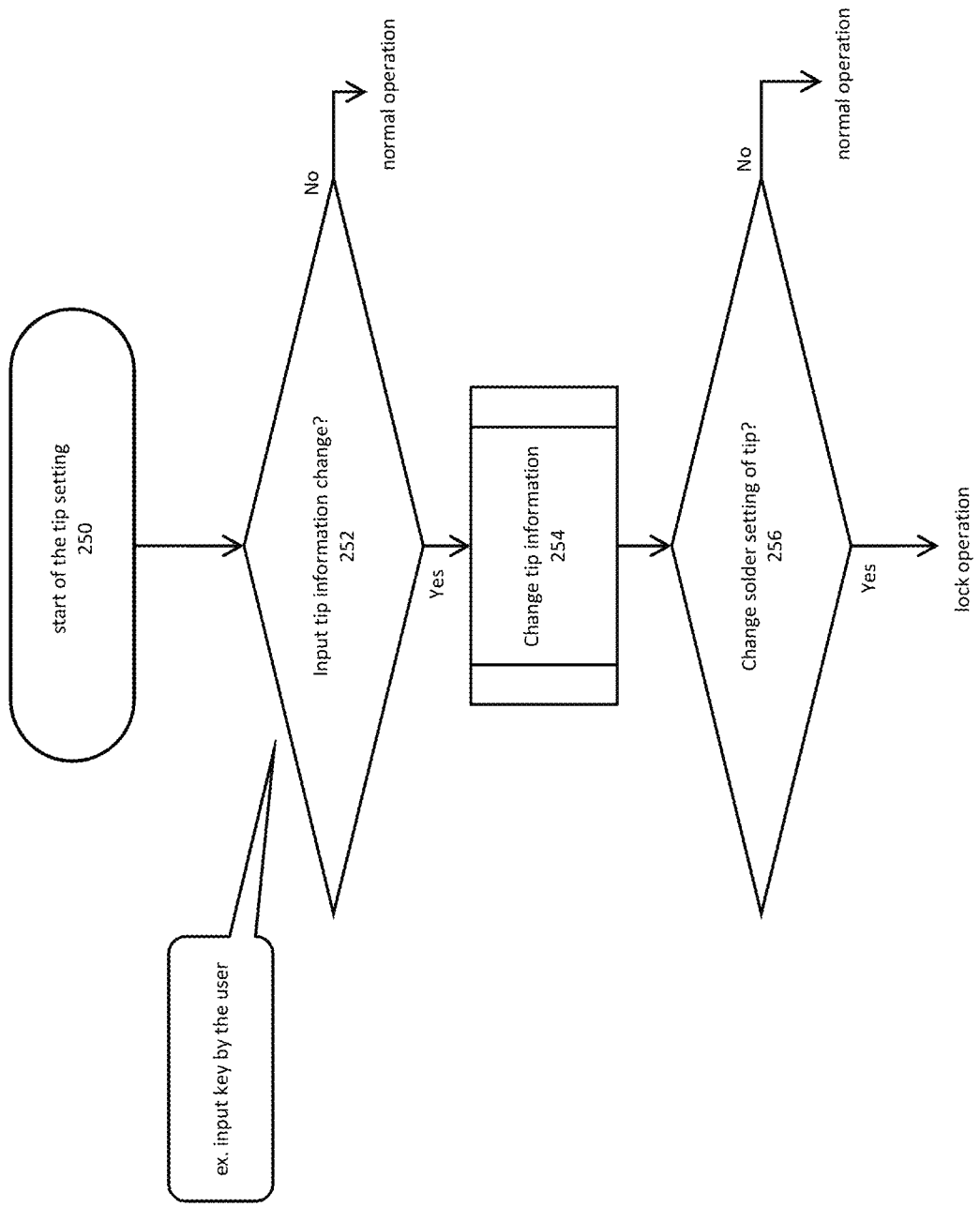

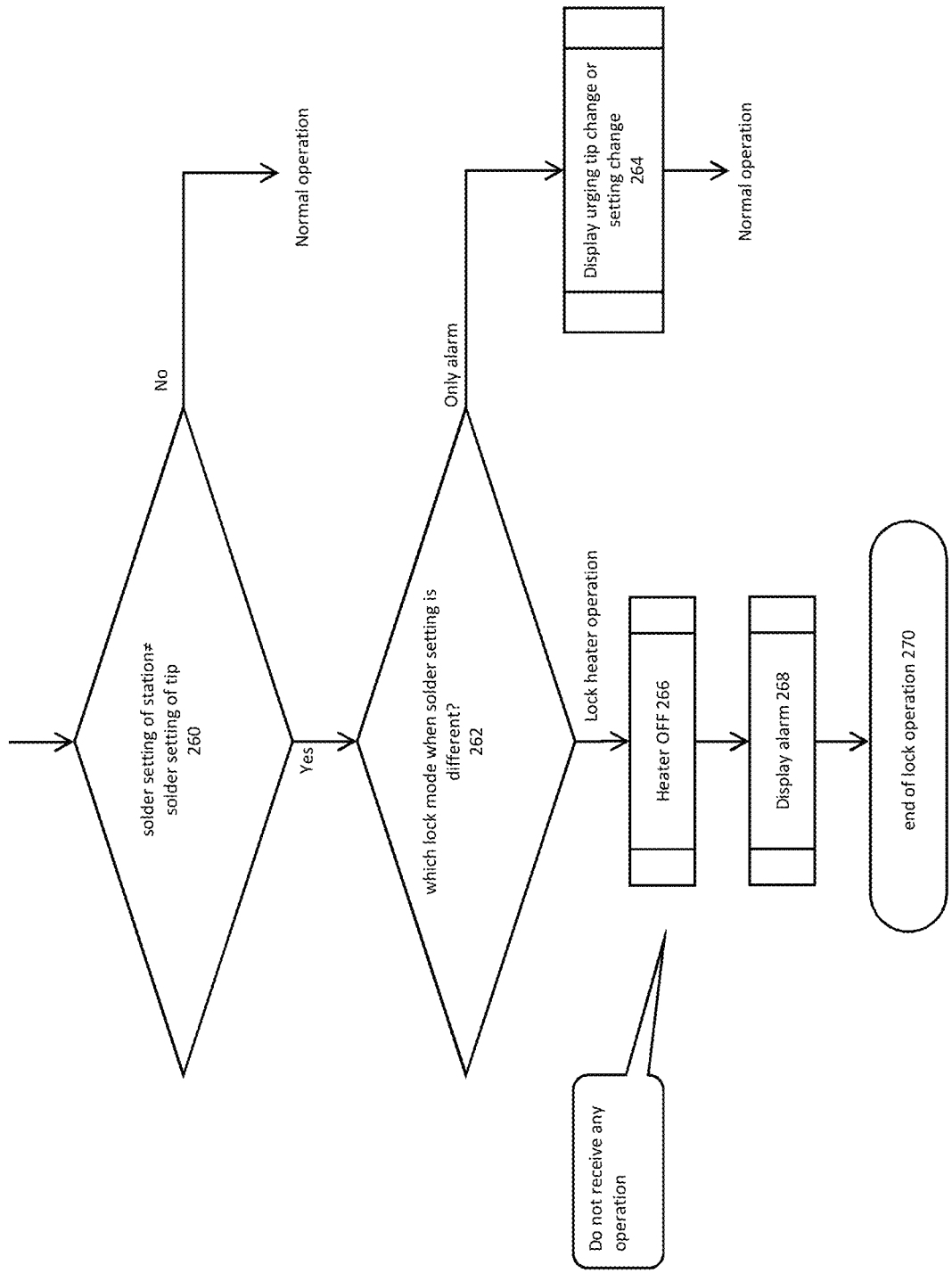

Prevent lead contamination

| Parameter setting | | setting of LEAD/ LEAD FREE spec | setting to invalid use when tip having different setting from the unit setting is inserted | tip inserted | action | Alert |
|---|---|---|---|---|---|---|
| setting RED (default setting) | | LEAD/ LEAD FREE | ON/OFF | LEAD/ LEAD FREE | | |
| status | 1 | LEAD FREE | OFF | LEAD FREE | Nothing will happen. Can use normally. | |
| | 2 | | | LEAD | WARNING > ENTER (release > LCD will display "Pb" and will be able to use the tip | LEAD spec tip is inserted <Cancel Warning: ENTERED> |
| | 3 | LEAD FREE | ON | LEAD FREE | Nothing will happen. Can use normally. | |
| | 4 | | | LEAD | heater power will be OFF WARNING | LEAD spec tip is inserted Please turn the power off and change the tip. |
| | 5 | LEAD FREE | OFF | LEAD FREE | WARNING | LEAD FREE spec tip is inserted Set the tip to LEAD spec? YES/NO |
| | 6 | | | LEAD | Able to use. LCD will display "Pb" | |
| | 7 | LEAD FREE | ON | LEAD FREE | heater power will be OFF WARNING | LEAD FREE spec tip is inserted Set the tip to LEAD spec? YES/NO |
| | 8 | | | LEAD | Able to use. LCD will display "Pb" | |

FIG. 5E

AUTO CALIBRATION MODE (MAIN PROGRAM)

TEMP. CALIBRATION SUB ROUTINE

TEMP. CALIBRATION SUB ROUTINE

LEAK VOLTAGE SUB ROUTINE

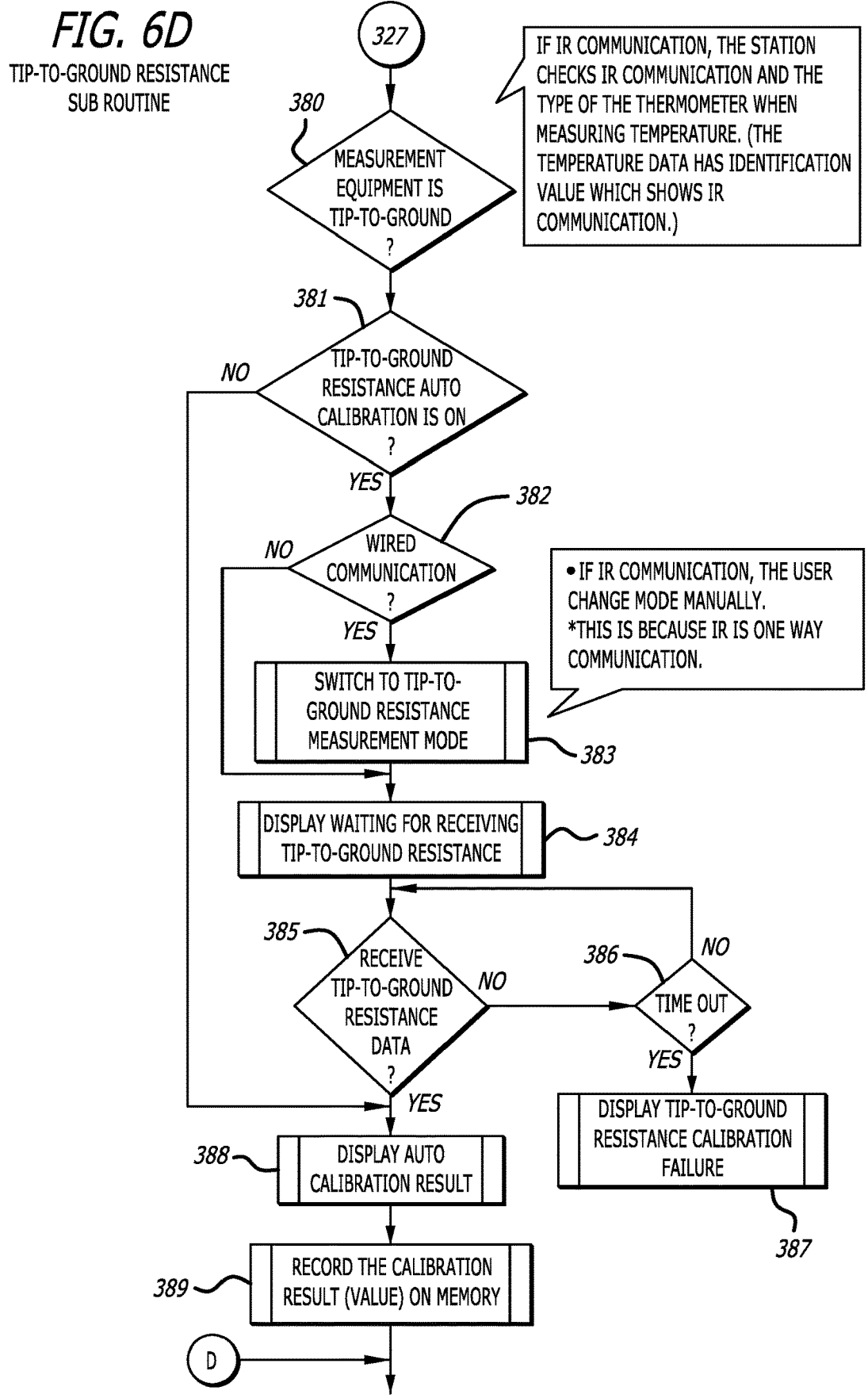

COMPOSITE SOLDERING, DE-SOLDERING STATION AND SYSTEM

BACKGROUND OF THE INVENTION

In the electronics industry the task of soldering electronic components is often a manual operation. The soldering function is performed by setting the work area on a work bench. The worker will operate the soldering device facing the work area. The soldering devices may include soldering irons, de-soldering irons, and tweezers but they are not limited thereto. The individual soldering device is connected to a power supply control device. The power supply control device controls the heat generation of the soldering device mainly by adjusting the power applied to the soldering device. Conventional power supply control devices include a power supply portion supplying power to the soldering device, a power supply control portion controlling the power output from the power supply portion, a temperature setting portion for inputting a set temperature which is the control target of the power supply control section, a display for displaying the setting information of the temperature setting portion, and a housing for housing or enclosing the circuitry. The worker or operator operates the temperature setting portion while viewing the information displayed on the display. This operation includes a process to update or set the setting information to the temperature setting portion. The setting information is information related to conditions for determining the set temperature of the soldering device as well as the physical characteristics of the work to be soldered. In industrial applications, the same set of soldering functions may be carried out by the operator, and the supervisors may impose conditions on the soldering operations to promote efficiency and uniformity. For example, the supervisor may set a maximum operating temperature for the power supply control device to prevent overheating of the work during the soldering operations.

BRIEF SUMMARY OF THE INVENTION

The present invention is directed to the components of an interchangeable multi-component system including a control station, heating tools comprising a handle and cartridges, associated sensor equipment and components, and components allowing interconnectability to a host or server via an intranet or internet. The control station includes enhanced features for interacting with and controlling the soldering heating tools, load detection functionality, tip management, automatic tip temperature calibration, cartridge/handle position and movement sensing and gateway or host system interactive capabilities.

BRIEF DESCRIPTION OF THE FIGURES

FIGS. 6B-1 and 6B-2 depict the steps for a basic program logic diagram to update an offset temperature for a cartridge.

FIG. 6D depicts the steps for a basic program logic diagram to update a tip to ground resistance.

DETAILED DESCRIPTION OF THE INVENTION

Figure 1:
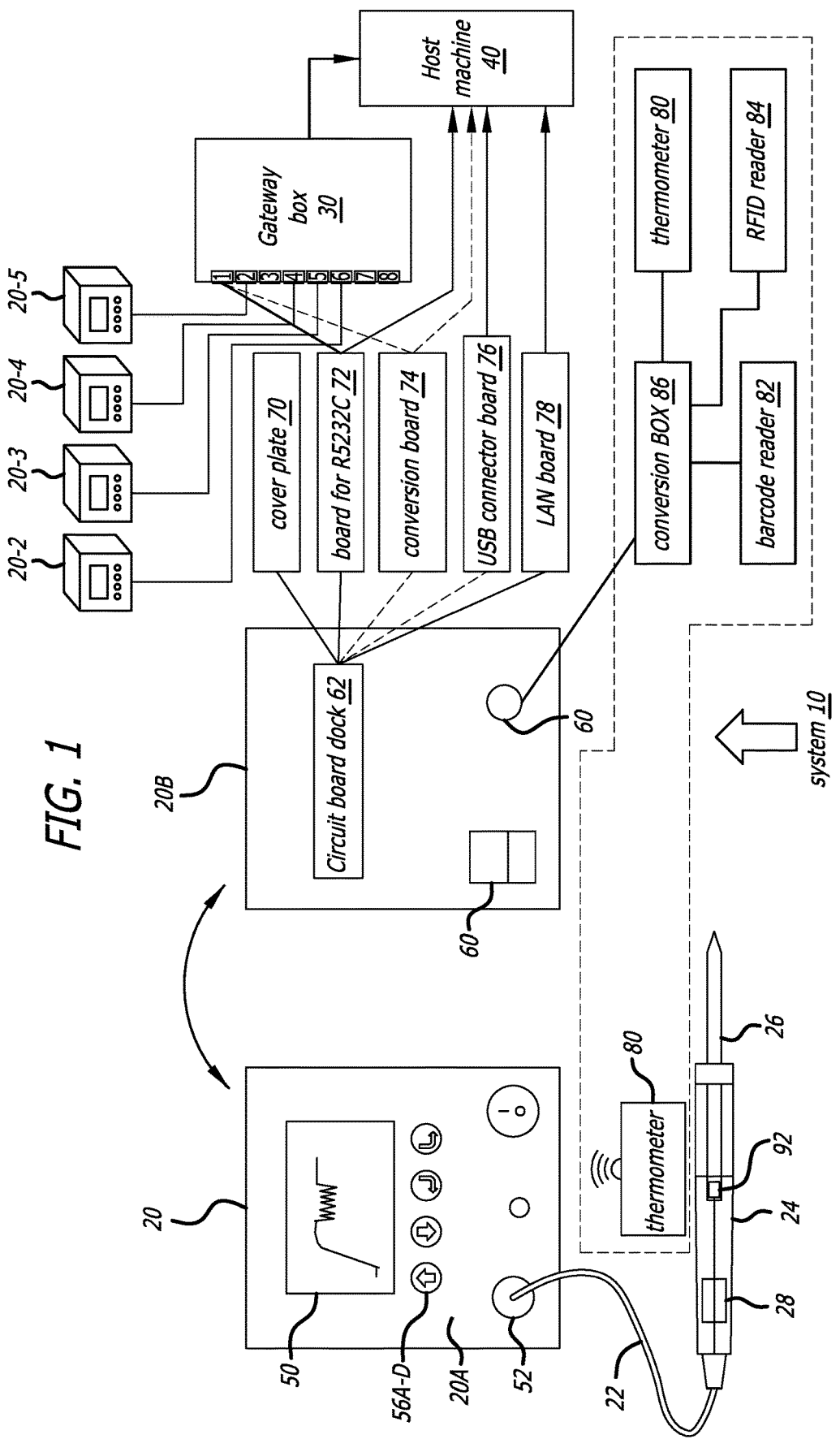
FIG. 1 provides a block and schematic depiction of the system of the present invention.

FIG. 1 provides a block and schematic depiction of the system 10 of the present invention. The system 10 is configured around a control station 20, which is connected via a cable assembly 22 to a handle 24 and cartridge 26. In FIG. 1, the cartridge 26 is depicted as being a soldering cartridge, however it should be appreciated that the cartridge 26 is removable and replaceable with a number of different types of cartridge thermal tools for soldering and de-soldering operations. Each type of cartridge comprises an integrated heater, sensor, and soldering tip. The control station 20 provides control signals and power to the cartridge 26, which an operator uses to carry out the soldering or de-soldering operations. The control station 20 is adapted to communicate with various sensor devices including the thermometer 80, as well as a gateway box 30 and a host machine 40. The host machine 40 may be a component of a protected intranet system, and it may alternatively be connected to the internet.

The control station 20 provides control signals and power to the cartridge 26, which an operator uses to carry out the soldering or de-soldering operations. The control station 20 is adapted to communicate with various sensor devices as well as a gateway box 30 and a host machine 40. The host machine 40 may be a component of a protected intranet system, and it may alternatively be connected to the internet.

The control station 20 has a front panel 20A and a rear panel 20B, depicted side by side in FIG. 1. On the front panel 20A, the control station 20 has a display 50, for example a liquid crystal display (LCD), although other displays for example a light emitting diode (LED) display may be used. The front panel 20A also includes a socket 52 allowing connection to the cable assembly 22, and a power switch 54 for powering the control station 20 on and off. The front panel 20A also includes a number of control or data entry components, depicted as buttons 56A, 56B, 56C, and 56D. It may be appreciated that the data entry components may be any number of electrical components including for example toggle switches, knobs, dials, and touch or optical sensors.

The rear panel 20B of the control station 20 includes a power socket 60, a circuit board dock 62 and one or more connector ports 64. FIG. 1 schematically depicts various items that may be affixed to the circuit board doc 62, including for example a cover plate 70, an RS232C circuit board 72, a conversion board 74, a USB connector board 76 and a LAN board 78. Each of these boards 72, 74, 76 and 78 may be used with appropriate cabling to connect the control station 20 to the gateway box 30 or the host machine 40. The board may be for any of an Ethernet, Ethernet for Control Automation Technology, Ethernet Industrial Protocol, Controller Area Network, Universal Asynchronous Receiver/Transmitter or I2C—Inter-Integrated Circuit, Serial Peripheral Interface.

The sensor devices may include one or more thermometers 80, a barcode reader 82 and/or an RFID reader 84. The system 10 contemplates that a wired thermometer 80, the barcode reader 82 and the RFID reader 84 may be coupled to a conversion box 86 that converts the respective data signals to data that may be used by the control station 20.

FIG. 1 also schematically depicts the handle 24 securing the cartridge 26. The handle 24 may include an acceleration sensor 28 and the cartridge 26 may include a memory element 92, for example a PROM, EPROM or EEPROM. The memory element 92 may be used to store information specific to the type of cartridge that cannot be changed (fixed data) and it may store information that is written to the memory by or via the control station 20 (variable data). The fixed data may include for example a cartridge serial number, tip shape data, and factory set temperature data for each cartridge. The variable data may include programmed set temperature data, temperature offset values, applied load counts, totaled powered time, total solder operations, and any use with leaded solder. Applied load counts may account for non-solder operations (thus a number higher than total solder operations) or it could be a total on powered time.

Load Detection Function

The control station 20 preferably includes a load detection function for identifying and quantifying the thermal load on the cartridge during each soldering operation. By detecting the thermal load imposed when the components and substrate are being heated to the temperature at which the solder is liquefied, and the load required to liquefy the solder, and timing the duration of the load, each load cycle for each soldering operation can be measured, counted and monitored. By counting the load cycles associated with a specific cartridge, the cartridge life can be monitored. In addition, by measuring the load cycle, the solder load for each soldering activity may be recorded and used for traceability of the work, as discussed further below. Also, once the control station 20 has recorded a defined load cycle for a particular soldering activity, or alternatively when a user defines a load cycle range for a particular soldering activity, the control station 20 can provide an indication to the operator when the load cycle of a subsequent soldering operation is outside an acceptable range of the defined load cycle.

Figure 2:
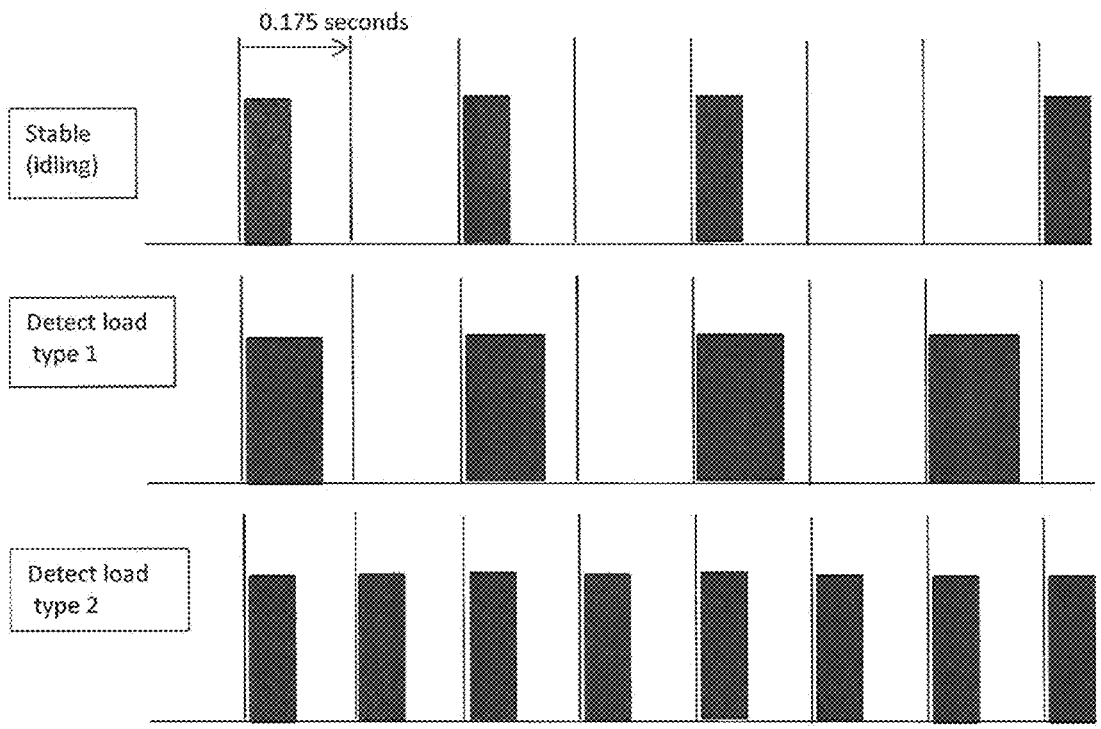
FIG. 2 schematically depicts the energizing or powering cycles of the cartridge.

FIG. 2 schematically depicts the energizing or powering cycles of the cartridge in time spaced blocks, depending on the use of soldering cartridge. As depicted in FIG. 2, the cartridge is powered at a 60 Hz cycle, and the load or amount energized is determined every 0.175 seconds, i.e. 21 pulses. The energized length will be varied depending on the cycle. For example, when the cartridge is powered at a 50 Hz cycle, the load or amount energized is determined every 0.21 seconds, i.e. 21 pulses. The amount of the energized load is determined depending on the difference of the set temperature point and the actual temperature as measured by a temperature sensor located in the cartridge tip. Normally when the temperature of the tip is idling at the set temperature point power level, the difference between the set temperature point temperature and the actual temperature measured by the temperature sensor is small, so the load amount as determined to be minimal. When a soldering operation is initiated, the load on the cartridge increases because heat is being transferred from the cartridge to the work and the control station 20 increases the power output to the cartridge. As the amount of energy delivered to energize the cartridge increases, or even if the amount stays the same but the frequency of the energization cycle increases, the system will determine that a soldering load is being applied. When the amount of energy delivered to energize the cartridges returns to close to the idling state, the control systems 20 will judged that the soldering load has ended. The soldering load is not detected in only one cycle (0.175 seconds, 21 pulses) but it is determined based upon the total energy within the time period that the thermal load is applied.

The foregoing description of the load determination is provided as an exemplary of the method. The method of identification of the load may change or may need to be adapted to accommodate changes in the circuit components other elements, such as heater performance. However, detecting the load will preferably rely upon identifying the temperature difference of the set temperature and the actual tip temperature measured by a temperature sensor.

Figure 3:
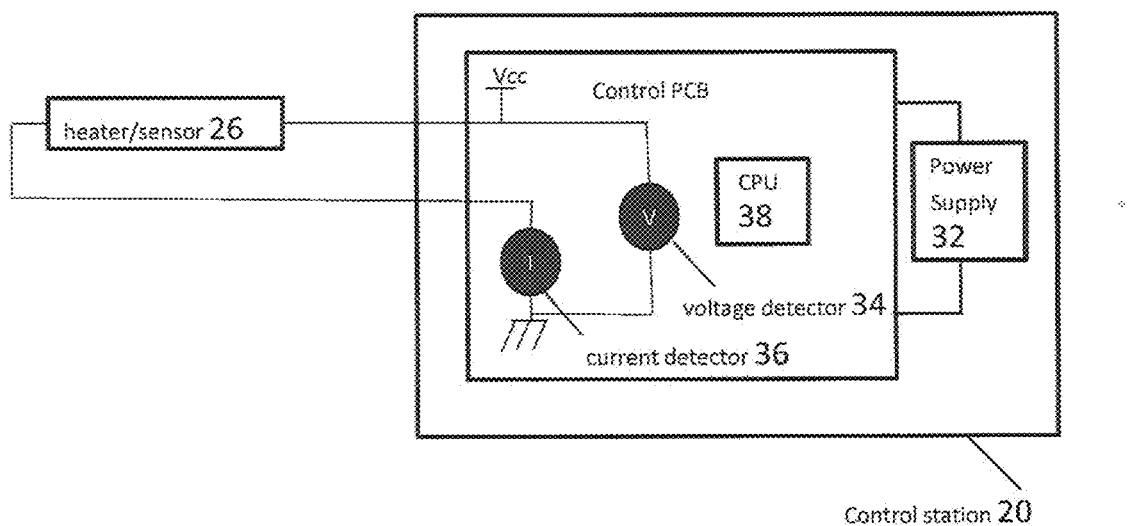
FIG. 3 is a simplified schematic of the load detection circuit.

FIG. 3 provides a simplified schematic of the load detection circuit. In this embodiment, the control station 20 includes a power supply 32, voltage detector 34, current detector 36, all controlled by a CPU 38. The control station 20 detects the supplied voltage V with the voltage detector 34, and the supplied current I with the current detector 36, and they report the voltage and current to the CPU 38. From the detected V and I, the input energy W can be calculated by the CPU 38: V×I=W. The CPU 38 of the control station 20 includes a clock or timing circuit, allowing the CPU 38 to calculate the thermal load in joules J delivered to the heater of the cartridge 26, as the product of the input energy W over the length of time S for each soldering operation, as follows: W×S=J.

In addition, the soldering station may compute the input energy W, and average the input energy over a complete energization cycle to determine the average energy delivery for each pulse within an entire cycle. In practice, W is averaged according to the amount of energization in 21 pulses in one cycle. For example, if the amount of K pulses instead of 21 pulses, calculate the energy of 1 cycle as follows. $K \div 21 \times W \times S = J^P$. Here, S is 0.175 seconds if it is 60 Hz powered system.

The energy $J^i$ applied during an idling state when no soldering load is applied to the cartridge tip is calculated or measured and stored in the control station. The value of $J^i$ derived in advance for each type of soldering device is applied for each set temperature.

When a load is detected, the control system 20 calculates the soldering thermal load energy $J^s$ over the length of time $S^s$ that the soldering load is applied.

$$W \times S^s = J^s$$

From the energy $J^s$ under load and the energy $J^i$ at the idling state, the control system 20 can calculate the thermal load in joules $J^{tl}$ used in the soldering operation as: $J^s - J^i = J^{tl}$. This calculated $J^{tl}$ is the input energy to the load and may be set as the defined load cycle. The control system 20 calculates the energy for each cycle from the start to the end of the load condition. When the load state is terminated, the control station 20 has determined the energy $J^{tt}$ used for the soldering operation. This calculated $J^{tt}$ is the energy input to the load and can be the energy defined for using the cartridge and performing a proper soldering operation.

Figure 4:
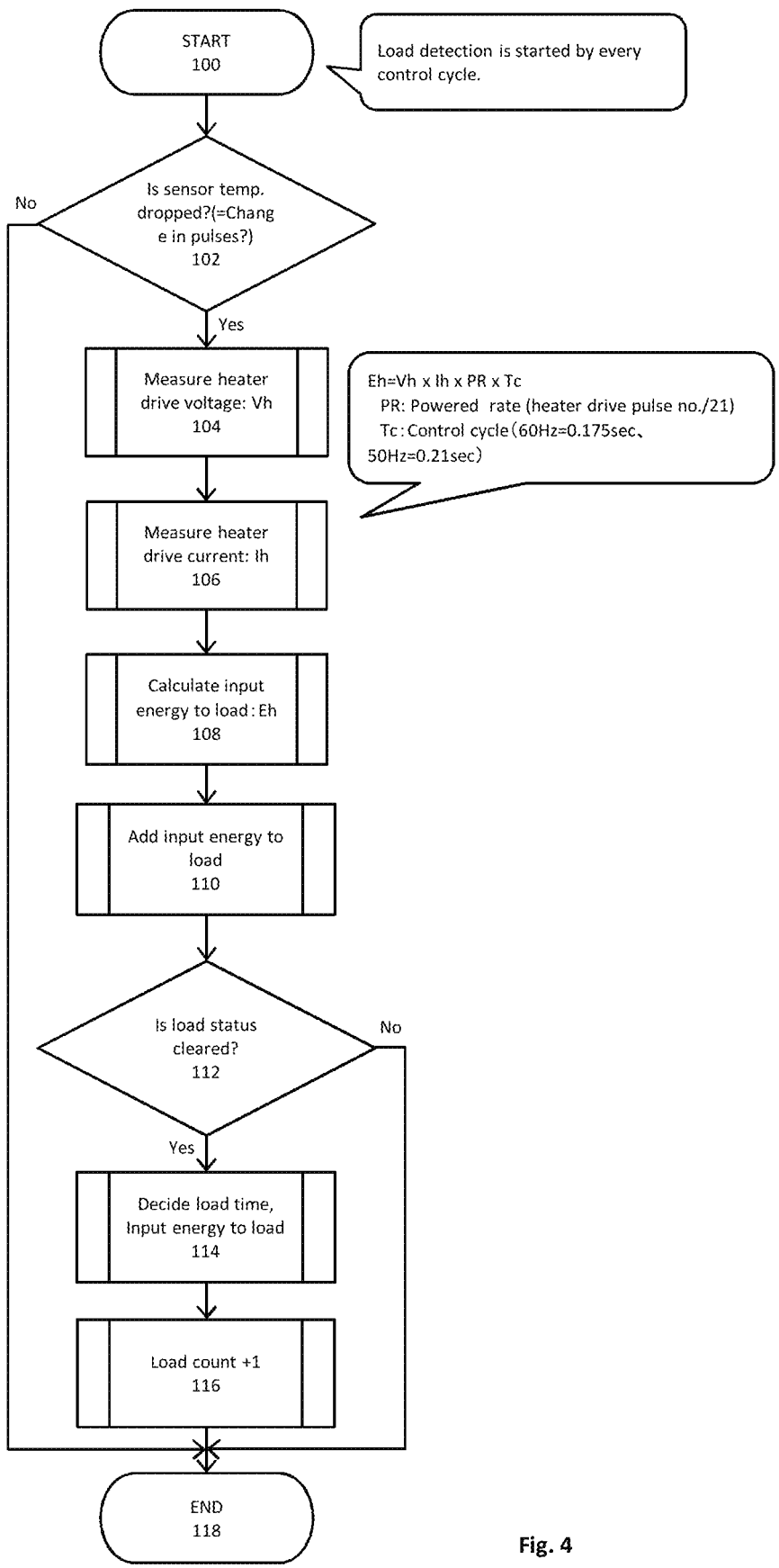
FIG. 4 is a program logic diagram for the software for the load detection function.

FIG. 4 provides a program logic diagram for the software for the load detection function. The "Start" 100 of the load detection cycle is initiated with every control cycle, such that whenever the control station 20 is on and a cartridge is being powered, the load detection function is operational. At step 102, the determination is made as to whether the cartridge tip temperature sensor temperature has dropped. If yes, then at step 104 the control system measures the cartridge heater drive voltage V. At step 106, the control system 20 measures the cartridge heater drive current I. At step 108, the control system 20 calculates the required additional input energy requirement of the cartridge E. At step 110, the additional input energy E is delivered to the cartridge. At step 112, the control station 20 makes the determination as to whether the load has been removed or cleared, i.e. the soldering function has been completed. If at step 112 the determination is "yes," then the control system determines the total load time and the total input energy delivered to the cartridge for the soldering operation. Next, at step 116, the control systems 20 increments the memory field for the loads. After the completion of the cycle, the control system 20 continues to the end step 118. If the step 102 determination is "no", then the system proceeds to the end step 118. Also, when in step 112 the load status is not cleared, then the control system 20 continues to the end step 118.

Tip Management Function

As discussed above with respect to FIG. 1, the cartridge 26 may include a memory element 92, for example a PROM, EPROM or EEPROM. The memory element 92 may be used to store information specific to the type of cartridge that cannot be changed (fixed data) and it may store information that is written to the memory by or via the control station 20 (variable data). The fixed data includes information that is specific to the identification and design requirements of a specific cartridge 26. Soldering cartridge tips may have many different designs configured for particular soldering operations. Accordingly, the cartridge tips may for example be pointed, round, triangular, beveled cones, square, rectangular or chisel, and they may be of various sizes and dimensions. The design of the tip, and the thermal mass of the tip, both impact the delivery of heat from a heating element within the cartridge through the cartridge tip to the work being soldered. Very small tips efficiently transfer thermal energy from the heating element of the cartridge to the work, but their low thermal mass means that when the tip first contacts the work, the tip temperature can drop rapidly, and thus may be easily sensed, causing the control station 20 to increase the power delivered to the cartridge. By comparison, larger tips require higher power levels to maintain a tip temperature, but their larger size and thus larger thermal mass balance the heat transfer process so that the tip temperature may not decrease significantly when the tip contacts the work and thermal transfer to the work is initiated.

The system 10 of the present invention is configured to be used with a substantial number of different soldering and de-soldering tools, and thus a wide variety of different heating element configurations and cartridge tip designs. It is therefore beneficial to provide the option of a memory element 92 in the cartridge 26 that stores particular information concerning the cartridge 26 and the cartridge tip. For example, each cartridge 26 may be assigned a unique serial number that may be read by the control station 20 when the cartridge 26 is inserted into the handle 24, and the control station 20 is powered on. A first portion of the serial number may identify the model number of a particular cartridge series and a second portion of the serial number may uniquely identify each individual cartridge in the model number. The control station 20 may read the first portion of the serial number and, by reference to a look-up table stored in a memory of the control station 20, identify characteristics common to the particular model number of the cartridge 26. For example, the characteristics may include the factory recommended set temperature as well as minimum and maximum operating temperatures. Alternatively, the control station 20 may read the serial number of the cartridge 26 and then the control station 20 may query the host machine 40, directly or through the gateway box 30, for specific information or operating instructions concerning the particular cartridge 26.

The memory element 92 of the cartridge 26 may be programmed with a variety of information concerning the cartridge 26 and its tip. For example, the memory element 92 may be programmed with information concerning the tip shape, the set temperature that the control station 20 should use for the cartridge 26 for a particular cartridge model, an offset temperature unique to the cartridge 26, an "applied load" count reflecting the number of times that the cartridge has been used to solder a component, the total "powered on" time for the cartridge. The memory element 92 may also be programmed to record the average energy used for a soldering operation, and it may allow user programming of defined soldering parameters that the control station 20 may use to monitor specific soldering operations.

The control station 20 may read the information of the memory element 92 of the cartridge 26 and based upon its own programming or by querying the host machine 40 for instructions, utilize the programmed data from the memory element 92 to control the delivery of power to, and the use of, the particular cartridge 26. For example, the control station 20 may read the set temperature data for the cartridge 26 to establish and display the set temperature for the operator. The set temperature may be set when the cartridge is manufactured, or it may be programmed by the operator using the control station 20 for particular soldering operations or solders. The set temperature may also be set by the host machine 40 providing instructions to the control station 20. While a certain model series of cartridges may all have similar set temperatures, each individual cartridge may be unique, for example because of its use history the actual temperature of the tip when powered on may be different from the set temperature. Accordingly, by comparing the actual tip temperature based upon either a tip temperature sensor or an external thermometer, a control station 20 may determine an offset temperature for a specific cartridge 26. The offset temperature may be recorded to the memory element 92 and used by the control station 20 to adjust the standardized tip temperature power level to an offset tip temperature power level.

The memory device 92 may also maintain a record of the total applied load count as well as a total powered time for the cartridge. The data for these counts may be used and uploaded to the host machine 40. The information may be useful to establish a baseline life expectancy for specific cartridges used in repetitive soldering operations, and for recognizing when cartridges fail prematurely. Once a baseline is established for a particular cartridge model, the control station 20 or the host machine 40 may recognize when a replacement cartridge is nearing the end of its expected useful life.

The memory element 92 may also include a "lead solder" flag that may be triggered the first time that the cartridge is used with leaded solder. The "lead solder" flag may be used by the control station 20 to warn an operator not to use a particular cartridge that has previously been sued with solders containing lead to avoid cross-contamination of a work that must be lead free. The information of the memory element 92 may also be used to cause the control station 20 to output warnings to the operator, either by visual or audible signals, and may be used to prevent the operator from using a particular cartridge 26 until the operator affirmatively acknowledges the warning signal. For example, the control station 20 may provide a warning, and it may not power up a cartridge 26, if the "lead solder" flag has been read by the control station 20. In that case, the user may be required to activate one of the buttons 56A-56D to acknowledge the "lead solder" warning and confirm to the control station 20 that the cartridge 26 may be powered on. The "lead solder" flag is particularly significant as it may be read by any control station 20, even the control station that did not originally trigger the flag, so that a cartridge that is borrowed or exchanged between work stations does not accidentally cross contaminate a work piece. Preferably, the "lead solder" flag is written to a portion of a memory in the memory element 92 that, once triggered, cannot be reset accidentally or purposefully.

Figure 5:
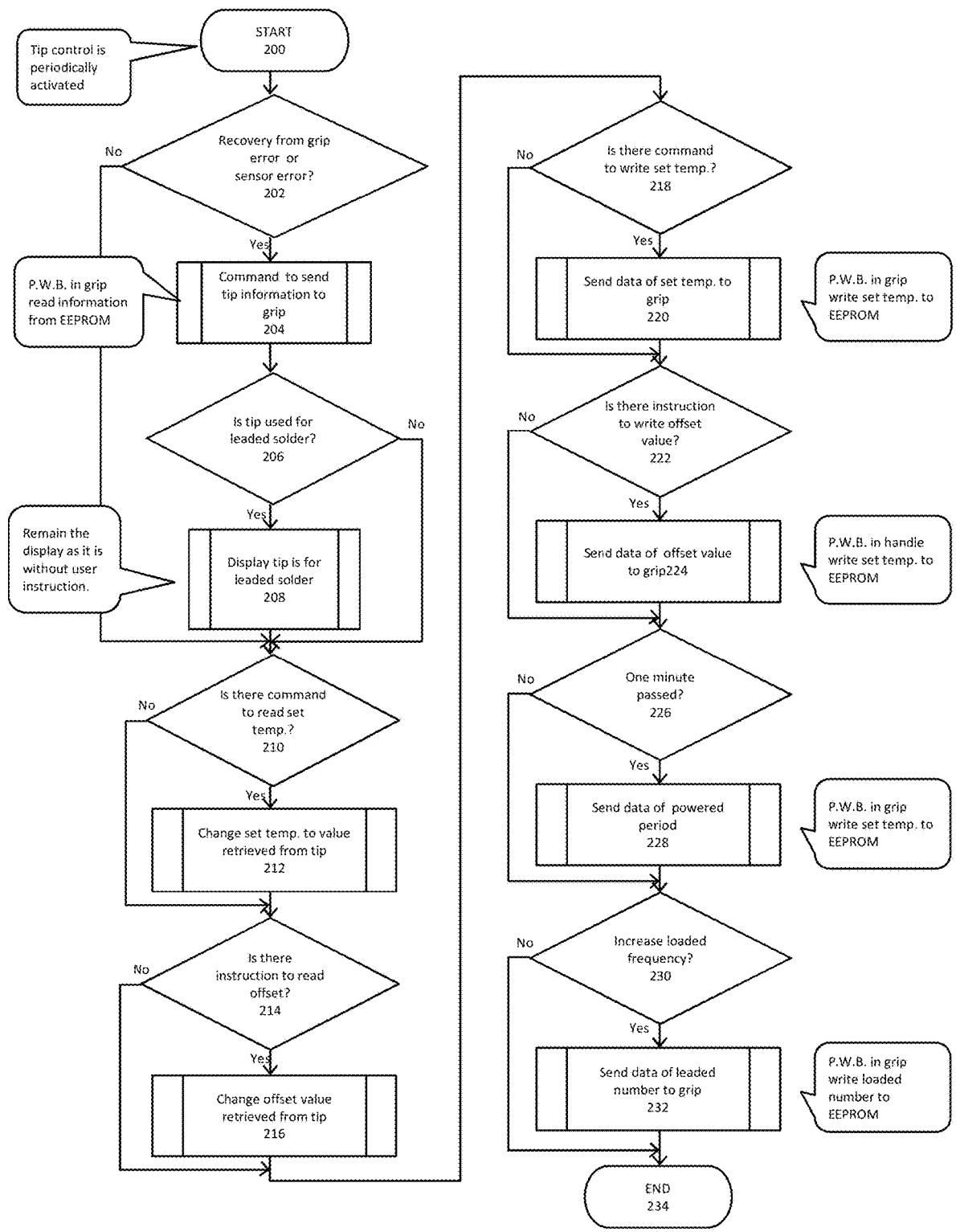
FIG. 5A is a program logic diagram for a cartridge tip management program.
FIG. 5B depicts the details of the program logic steps of a sub-routine to set the lead solder and lead-free solder settings within the control station.
FIG. 5C depicts the details of the program logic steps of a sub-routine to set or reset the lead solder and lead free solder for an inserted soldering cartridge and its tip.
FIG. 5D depicts the details of the program logic steps of a "lead solder" sub-routine of a lock operation program.
FIG. 5E is a graphic depiction of a look-up table that the program logic of the "lead solder" subroutine may utilize to alert a user to a lead solder flag associated with a specific cartridge.

An exemplary cartridge tip management program for the control station 20 or host machine 40 is depicted in FIG. 5A. The "start" 200 of the cartridge tip management program is initiated when a new cartridge 26 is inserted in the handle 24, and the control station 20 is powered on. The "start" 200 of the cartridge tip management program may also be activated periodically on a schedule programmed into the control station 20 or the host machine 40. At step 202, the determination is made as to whether the control station 20 is being reset as a result of a handle error or sensor error, which detects if the cartridge tip has been removed or replaced or if the grip is not connected to the control station 20. If a handle error or sensor error has occurred and thereafter the error is corrected and the system has recovered from the error, and when the control station 20 is initially turned on, then the program proceeds to step 204, where the control station 20 queries the memory element 92 to data stored in the memory element 92. At step 206, the control program determines if the data from the memory element 92 includes a "lead solder" flag. If yes, then the program goes to step 208 where the program outputs a display or an alert on the control station 20 to advise the operator that the cartridge has been used with leaded solder.

If at step 202 or at step 206, the determination is no, and after step 208, the program proceeds to step 210. At step 210, the program determines if there is a command to read the set temperature for the cartridge 26. If the determination at step 210 is yes, then the program proceeds to step 212 where the program changes the set temperature for the control station 20 to the set temperature retrieved from the memory element 92 of the cartridge 26. After step 212, or if the determination at step 210 is no, the program proceeds to step 214. At step 214, the program determines if there is an instruction to read the offset temperature. If there is such a command, the offset temperature is read from the memory element 92 and then the program proceeds to step 216, where the program changes the control set temperature using the offset temperature value retrieved from the memory element 92. After step 216, or upon a negative determination at step 214, the program proceeds to step 218. At step 218, the program determines if there is a command to write an updated set temperature to the memory element 92. If the determination is yes, then the program proceeds to step 220, where the control station 20 sends a command through the handle 24 to the cartridge 26 to update the set temperature for the cartridge 26 that is stored in the memory element 92. After step 220, or after a negative determination at step 218, the program proceeds to step 222. At step 222, the program determines if there is an instruction to write a new offset temperature value. If there is such an instruction, the program proceeds to step 224 where the program sends new data for the offset temperature through the handle 24 to the memory element 92 in the cartridge 26. After step 224, or after a negative determination at step 222, the program proceeds to step 226.

At step 226, a timing function is initiated and the program determines if one minute has passed. Upon a determination that one minute has passed, and for each minute that the cartridge 26 is powered on by the control station 20, the program executes a function at step 228 to update the "powered on" data field of the memory element 92 to increment another minute. After step 228, or after a negative determination at step 226 (when a full minute is not timed out), the program proceeds to step 230. At step 230, the determination is made as to whether the cartridge has undergone an energy load equivalent to a soldering event load. If the determination is made that a soldering event has occurred, based upon the energy load experienced by the cartridge 26, the program proceeds to step 232. At step 232, the program updates the load number to the memory element 92. After step 232, or after a negative determination in step 230, the program proceeds to step 234, which is the end of the tip management program.

In addition to the main operational programs, the control station 20 has additional programming to allow the user enhanced operational control over the soldering processes and use of the soldering cartridges. Accordingly, FIGS. 5B, 5C and 5D provide additional programing logic flow charts for subroutines for the control station 20.

FIG. 5B depicts the details of the program logic steps of a sub-routine to set the lead solder and lead-free solder settings within the control station 20. In the logic flow chart of FIG. 5B, the solder setting sub-routine starts at block 240, where a user is prompted as to whether the user wants to initiate a station setting. If the user elects to make a setting, the program proceeds to decision block 242, where the program causes the control station 20 to display a prompt to the user to input a system parameter change. If the user elects not to enter a change, then the subroutine terminates, and the control program reverts to the "start" block 200 of FIG. 5A. If at decision block 242 the user elects to make a change, the subroutine advances to the change system parameter block 244, where the sub-routine prepares to enter a change parameter into the control program memory. The sub-routine then proceeds to decision block 246 where the program causes the control station 20 to display a prompt for the user to change the "lead" solder setting of the control station. The control station also displays the current "lead" solder setting (on or off) so that the user can determine if a change needs to be made. If the user then decides not to make a change (enters "no"), then the subroutine terminates, and the control program reverts to the "start" block 200 of FIG. 5A. If at decision block 246 the user elects to change the "lead" solder setting and enters "yes" the sub-routine update the lead solder setting for the control station 20, and the control program advances to a "lock operation" subroutine depicted in FIG. 5D and discussed below. This sub-routine allows the user to check the status of the "lead" solder setting of the control station and reset the control station settings, if necessary.

FIG. 5C depicts the details of the program logic steps of a sub-routine to set or reset the lead solder and lead free solder for an inserted soldering cartridge and its tip. In the logic flow chart of FIG. 5B, the lead/no-lead solder tip setting sub-routine starts at block 250, where a user is prompted as to whether the user wants to initiate a tip setting sub-routine. If the user starts the sub-routine, then the program proceeds to decision block 252 where the program causes the display of the control station 20 to prompt the user to enter a tip information change. If the user elects not to make a change, then the sub-routine terminates, and the control program reverts to the "start" block 200 of FIG. 5A. If at decision block 252 the user elects to make a change (enters yes), then the program advances to the change tip information block 254, where the sub-routine prepares to enter a change parameter into the control program memory. The sub-routine program then advances to decision lock 256, where the program causes the control station to display the present "lead" or "no-lead" solder status of the cartridge and prompts the user to elect to change the setting. If the user elects not to change the setting, entering "no", then the sub-routine terminates, and the control program reverts to the "start" block 200 of FIG. 5A. If the user elects to change the setting, enters "yes", the sub-routine changes the "lead" or "no-lead" solder status of the cartridge within the memory of the control station 20. Upon the completion of the sub-routine program, the control program advances to a "lock operation" subroutine depicted in FIG. 5D and discussed below.

FIG. 5D depicts the details of the program logic steps of a sub-routine of a lock operation program that is entered after the last step of either of the sub-routines of FIG. 5B or 5C. Upon the control program entering the lock operation program, the program enters a decision block 260 where the program causes the control station 20 to display a "solder setting of station or solder setting of tip" option to the user. If the user decides not to enter the sub-routine and enters "no" then the sub-routine terminates, and the control program reverts to the "start" block 200 of FIG. 5A. However, if the user elects to continue with the lock operation program, entering "yes", then the program advances to decision block 262, where the program causes the control station 20 to display a prompt for the user to select which lock mode solder setting is different: "alarm only" or "lock heater operation." If the user selects "alarm only" the program proceeds block 264 where the program causes the control station to display urging the user to change the cartridge, the cartridge tip setting, or change the control settings. Depending upon which action the user elects, the program returns to the start block of FIG. 5A, or the beginning of the sub-routines of FIG. 5B or 5C. If at decision block 262 the user selects "lock heater operation" the program advances to the "heater off" block 266 where the control station 20 terminates delivery of power to the cartridge. The program then advances to the "display alarm" block 268 where the program causes the control station to display an advisory to the user that the cartridge has been used with lead solder and should not be used in any non-lead solder operations. The program then advances to the end lock block 270. In order to continue, the user will then need to change the cartridge or reset the settings, and restart at the beginning of the control operation of FIG. 5A.

FIG. 5E provides a look-up table that may be used in within the lead solder subroutine of FIG. 5D. The first column identifies the eight parameter settings. The second column identifies the "lead free" or "lead" settings. The third column identifies when the control station will identify a valid or invalid attempted use of a cartridge based upon its "lead free" or "lead" setting. The fourth column lists the options for each of the various settings that may be referenced when a cartridge is inserted and the "lead" data flag is read by the control station. The fifth column identifies the action that the control station will take, based upon the program, for each of the respective parameter settings when a cartridge is inserted. The sixth column identifies when the control station will provide an alert to the user, for example to advise the user that a cartridge that has been used with lead solder is inserted but the station is set for use with lead free solder. Other examples of the lock operation procedures are as follows. For lead free solder setting of the unit of station and soldering iron, when lead free tip is inserted, the user can use the unit normally. But when the tip which used with lead solder is inserted, the user can select to display the warning indication, or stop the power to the heater and warning indication. For lead solder setting, when the lead tip is inserted, the user can use the unit normally. But when the tip which is used with lead free solder is inserted, the user can select to display the warning indication, or stop the power to the heater and warning indication.

The foregoing program descriptions are merely exemplary and may be supplemented with subroutines to incorporate the additional functionalities of the tip management program to utilize other data components stored in the memory element 92.

Automatic Temperature Adjustment and Calibration Record

The system 10 of FIG. 1 depicts a cartridge 26 that is removably inserted into the handle 24 connected to the control station 20. As discussed above, the cartridge can have any number of tip configurations. Generally, however, each cartridge will include a heating element and a temperature sensor. The temperature sensor may be a thermocouple that is generally located inside of and proximate the tip, to try an accurately monitor the tip temperature. The temperature at the temperature sensor is determined by the control station 20 based upon the electromotive force of the thermocouple.

FIG. 1 also depicts a pair of thermometers 80 external to the control station 20 and cartridge 26. The thermometer may be hard wire connected to the control station through the conversion box 86 as shown in FIG. 1. Alternatively, the thermometer 80 may connect to the control station 20 via an infra-red, optical, blue tooth or radio frequency data link. The temperature sensed by the external thermometer 80 may be used to monitor the accuracy of the temperature sensor inside of the tip of the cartridge. If the temperature of a cartridge tip that is powered on as measured by the thermometer 80 is different from the temperature determined from the temperature sensor in the cartridge, the control station 20 may update the set temperature for the cartridge 26. In addition, the difference between the two temperature measurements provides and adjustment value that the control station 20 may record to the memory element 92 in the cartridge 26 as an offset temperature. The control station 20 may also record the calibration event data to the memory element 92 in the cartridge 26 and report the calibration event data to the host machine 40. The control station 20 may include programed limitation parameters on the magnitude of the offset that can be accepted. Thus, the control station 20 may not allow an offset greater than a fixed number, for example 10 degrees, 50 degrees or even 100 degrees.

Figure 6:
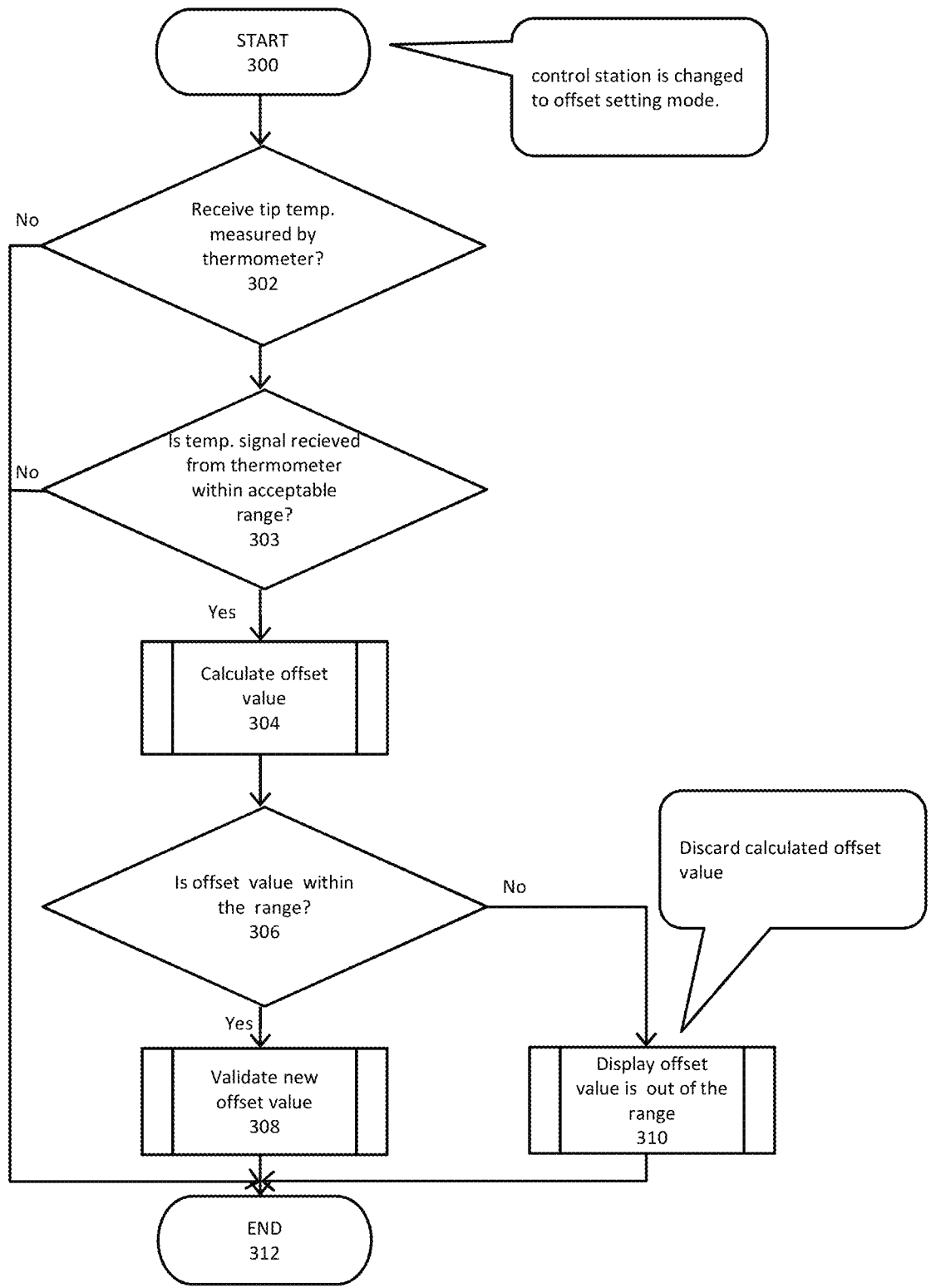
FIG. 6 depicts the steps for a basic program logic diagram to update an offset temperature for a cartridge.

FIG. 6 depicts the steps for a basic program logic diagram to update an offset temperature for a cartridge. At the start step 300, the control station 20 is controlled to operate in an offset temperature determination mode, the cartridge 26 is powered to a controlled level, and the program proceeds to step 302. At step 302, the determination is made as to whether the control station 20 has received a cartridge tip temperature signal from thermometer 80. If at step 302 the determination is yes, the program proceeds to step 304 directly, or to an optional step 303 in the case where a thermometer 80 is connected to the control station 20 and a determination is made as to whether the temperature signal from the thermometer is within an acceptable range of the temperature as measured by the temperature sensor in the cartridge. If at step 303 the temperature signal from the thermometer is not within the acceptable range, the control system 20 perceives that the thermometer is not actually measuring the cartridge tip temperature and the program skips to step 312. However, if at step 302 the thermometer measured tip temperature is within an appropriate range, the thermometer measurement is accepted and the program proceeds to step 304. At step 304, the control station compares the tip temperature as determined by the thermometer 80 to the temperature determined from the cartridge temperature sensor, to calculate the offset value. It should be noted that the offset value may be a positive or negative number, as the performance and accuracy of the cartridge temperature sensor may degrade over time. After step 304, the program proceeds to step 306 where a determination is made as to whether the offset value is within an acceptable range. If at step 306 the offset value is within the acceptable range, the program proceeds to step 308, where the control station 20 validates the new offset value and writes the new offset value to the memory element 92 in the cartridge 26. If at step 306 the determination is that the offset value is outside of the acceptable range, the program proceeds to step 310. At step 310, the out-of-range offset value is discarded and the control station 20 alerts the operator that the offset value was unacceptable. For example, an offset value greater than fifty degrees may be deemed outside of the acceptable range and the control station 20 may display an indication that the cartridge is defective. After the completion of step 308 or 310, and after a negative determination is made at step 302, the program proceeds to step 312, where the program ends.

The foregoing program is an example of a basic logic program for controlling the tip temperature of the soldering cartridge. An enhanced control program is depicted in the program logic diagrams of FIGS. 6A, 6B, 6C and 6D, as described below. These more detailed programs are described herein to further explain the control operations that are contemplated in the present invention.

Figure 6A:
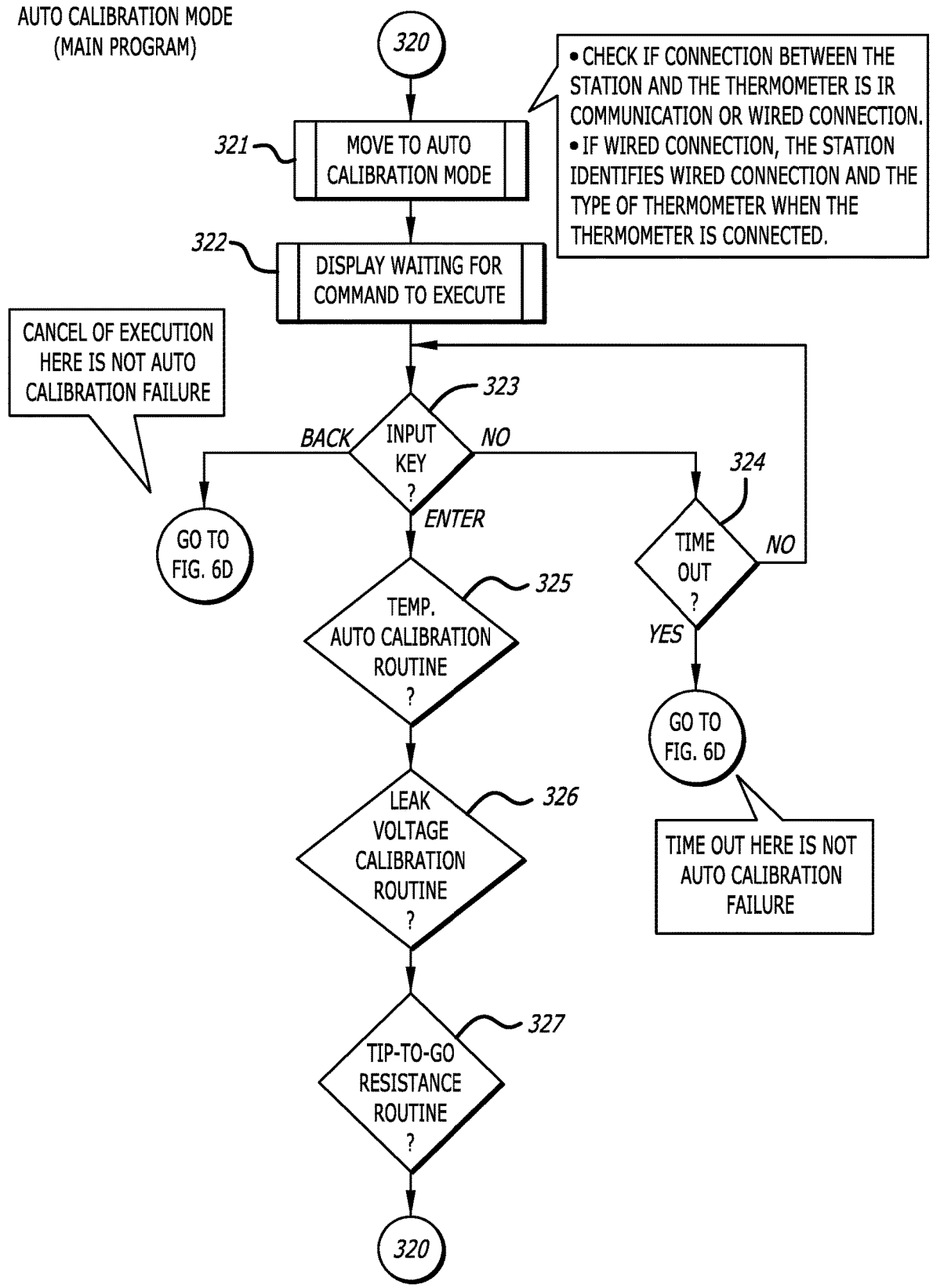
FIG. 6A depicts the steps for a basic program logic diagram of auto calibration main routine of calibration mode.

FIG. 6A depicts the logic and program steps of the initial sub-routine of an automatic soldering cartridge calibration program. At the beginning of a soldering operation, or after the control station has been on for an extended period without being used or activated, the auto calibration program of the control station 20 is in a "sleep" mode represented as block 320. When the control station is turned on, or otherwise activated out of the sleep mode, the auto calibration sub-routine proceeds to block 321, where the control station 20 provides a display to prompt the user to initiate the auto calibration. Upon the user initiating the auto calibration mode the program moves to step 322 where the control station displays a waiting for command to execute the auto calibration program. When the user confirms that the auto calibration program is to be activated, the program moves to step 323, where the user is prompted to input a "key" to start the auto calibration mode. If at step 323 the user does not input the key, the program advances to a "time out" function where a timer is initiated. If the user does not begin any activity with the soldering station and a preset time limit expires, then the program can advance to the beginning of the sub-routine depicted in FIG. 6D or return to the sleep mode of step 320. However, if the user activates the control station 20 or moves the soldering cartridge, then the program determines at step 324 that the control station is active, and the program returns to the beginning of step 323. If at step 323 the user elects to exit the auto calibration mode, the user can elect the "back" function and the control station can advance to the beginning of the sub-routine depicted in FIG. 6D or revert to the sleep mode of block 320 or advance to one of the other control program steps described above.

However, if at step 323 the user elects to proceed with the auto calibration mode and enters the key, then the program advances to the decision block 325 where the program causes the control station to display a prompt for the user to enter the temperature automatic calibration sub-routine. At that point, the user can elect to enter the temperature automatic calibration sub-routine, which is depicted in the program logic chart of FIG. 6B, or bypass that sub-routine. If the user elects to bypass the sub-routine, the program proceeds to decision block 326, where the program causes the control station to display a prompt for the user to enter the leak voltage calibration sub-routine. At that point, the user can elect to enter the leak voltage calibration sub-routine, which is depicted in the program logic chart of FIG. 6C, or bypass that sub-routine. If the user elects to bypass the sub-routine, the program proceeds to decision block 327, where the program causes the control station to display a prompt for the user to enter the tip to ground resistance routine. If the user elects to run the tip to ground resistance routine, the program advances to the tip to ground resistance sub-routine which is depicted in the program logic chart of FIG. 6D. If the user elects to bypass that sub-routine, then the program reverts to the sleep mode of box 320.

Figures 1, 6B:
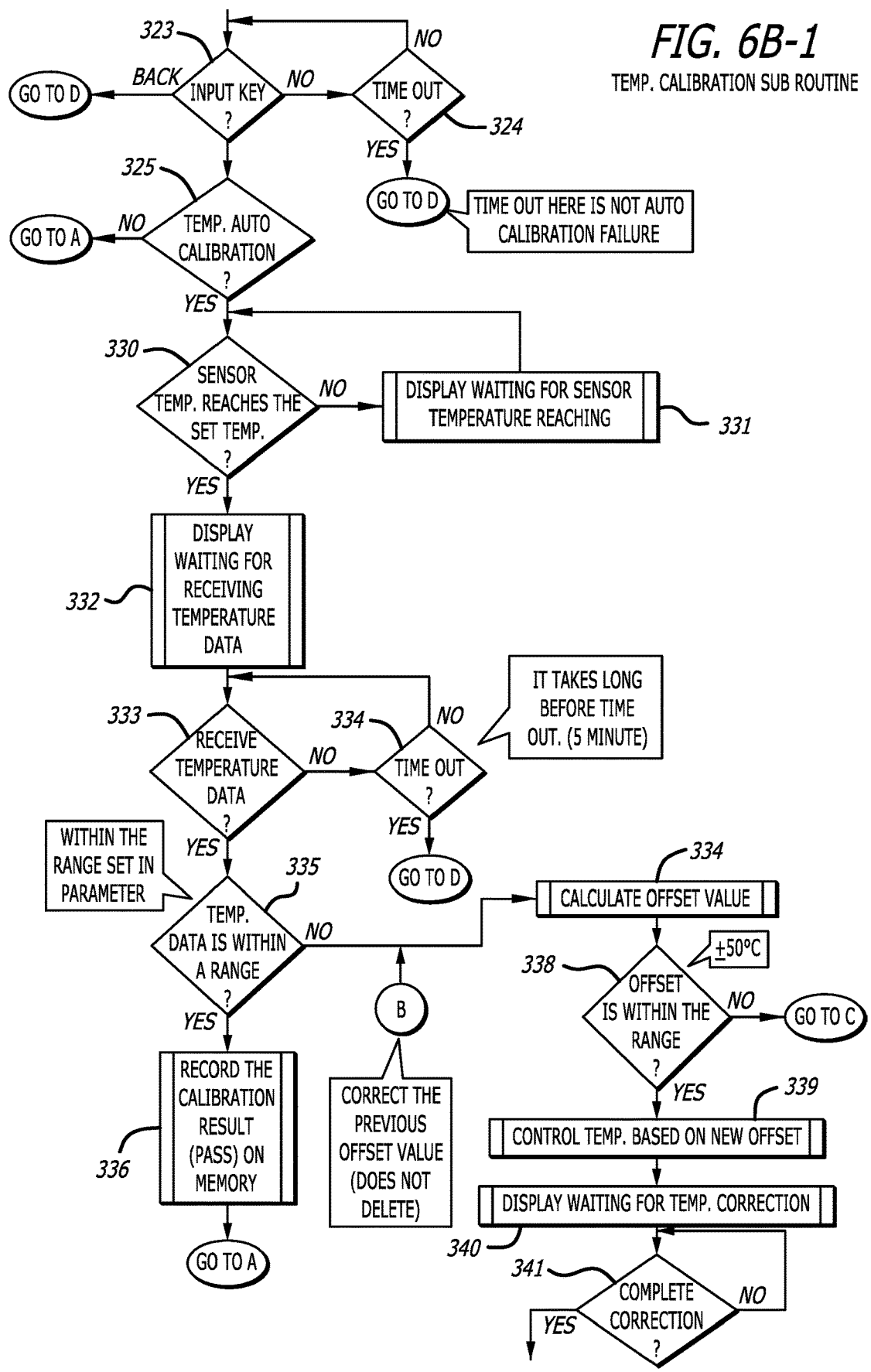
Figures 2, 6B:
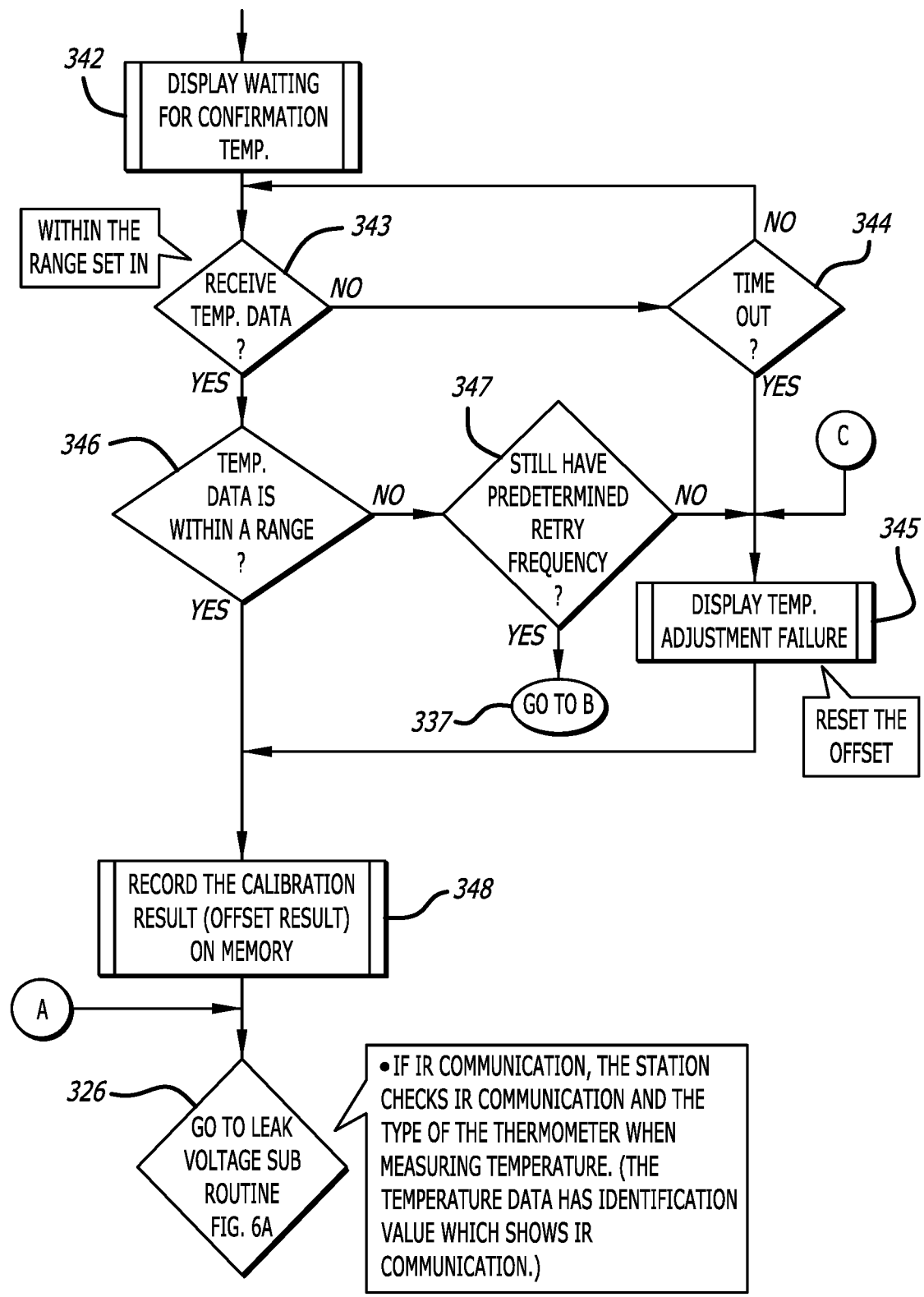

FIGS. 6B-1 to 6B-2 depict the detail steps for an alternative program logic diagram to update an offset temperature for a cartridge. The program of FIG. 6B-1, 6B-2 is depicted as a continuation of steps 323 and 325 of FIG. 6A. When at step 325 of FIG. 6A and as shown in FIG. 6B-2, the user elects to enter the temperature automatic calibration mode, the sub-routine advances to decision step 330, where the program determines if the sensor temperature has reached the set point temperature. This determination is based upon the sensed temperature received from the cartridge and the input temperature provided by the user. If at step 330 the program concludes that the sensor temperature has not reached the set point temperature, the program advances to step 331, where the program causes the control station to display a message that the control station is waiting for the sensor temperature to reach the set point temperature. The program then returns to the beginning of step 330. If at step 330, the program determines that the temperature of the soldering tip has reached the set temperature the program advances to step 332 and it causes the control station to display a waiting mode to receive the temperature data. The program then advances to decision block 333 where the program determines if it has received new temperature parameter data. If the program determines that it has not received new temperature parameter data, the program advances to step 334 initiating a clocking function. If the clocking function times out with no activation, the program advances to the sub-routine of FIG. 6C. However, if at step 334 the program receives an input before the preset time out limit is met, then the program returns to the beginning of step 333.

When at step 333 the program receives new temperature parameter data, the program advances to step 335 where the program checks whether the temperature range is within the new temperature parameter data range set in step 333. If at step 335 the program determines that the temperature range is within the temperature parameter data range, the program proceeds to record the calibration record at step 336, after which the program goes to leak voltage sub routine at step 326 in FIG. 6A.

When at step 335 the program determines that the temperature range is not within the temperature parameter data range, the program proceeds to step 337 where the program calculates the offset value. After calculating the offset value, the program advances to step 338 where the program determines if the calculated offset value is within a predetermined acceptable range. For example, if the acceptable range is plus or minus twenty degrees, and the calculated offset value is thirty degrees, then the offset value is unacceptable. If at step 338 the program determines that the offset value is outside of the acceptable range, then the program advances to step 345 where the program causes the control station to display a temperature adjustment failure. However, if at step 338 the program determines that the offset value is within the acceptable range, the program advances to step 339 where the program instructs the control station to control the temperature based upon the new calculated offset value. The program then advances to step 340 where the program causes the control station to display a waiting for temperature correction message. The program then advances to step 341 where the program makes the determination as to whether the temperature correction has been completed, and the measured cartridge tip temperature is equal to the new offset input temperature. If not, the program reverts to the beginning of step 341.

The flow chart of FIG. 6B-1 continues to the top of FIG. 6B-2. After the control station completes the correction when the program is at 341 (on FIG. 6B-1), then the program advances to step 342 (on FIG. 6B-2) where the program causes the control station to display that it is waiting for confirmation of the tip temperature and displays the measured tip temperature. The program then advances to decision block 343 where the program determines if it has received updated temperature data. If the program determines that it has not received updated temperature data, the program advances to step 344 where a clocking function determines if a preset period of time has elapsed without the program receiving updated temperature data. If after the completion of the time out period the program has not received updated temperature data, then the program advances to step 345, where the program causes the control station to display a temperature adjustment failure message. However, if at step 344 the program does not reach the time out period before the occurrence of an activity such as the receipt of updated temperature data, then the program returns to the beginning of step 343. When at step 343 the program receives updated temperature data, then the program advances to decision step 346, where the program determines if the temperature data is within a defined range.

If the program determines that the temperature data is not within the defined range, then the program advances to decision step 347. At step 347, the program repeats the step of determining if the temperature data is within the defined range a number of times. If upon a retry the program finds that the temperature data is within the defined range, the program returns to the beginning of step 337, depicted as balloon "B". If a preset number of retries occur before the program finds that the temperature data is within the defined range, the program proceeds to step 345 where the program causes the control station to display a temperature adjustment failure message to the user.

If at step 346 the program determines that the temperature data is within the defined range, then the program advances to step 348, where the program records the calibration or offset result to the memory of the control station. In addition, after step 345, the program also advances to step 348, where the program records the calibration or offset result to the memory of the control station. After step 348, the program advances to step 326 of FIG. 6A, the leak voltage sub-routine.

The foregoing described program details the program steps to allow the control station to record the temperature calibration records. In addition to temperature calibration, the control station may also be programmed to control, update and record leak voltage and tip to ground resistance data, as set forth in the program logic diagrams of FIGS. 6C and 6D.

Figure 6C:
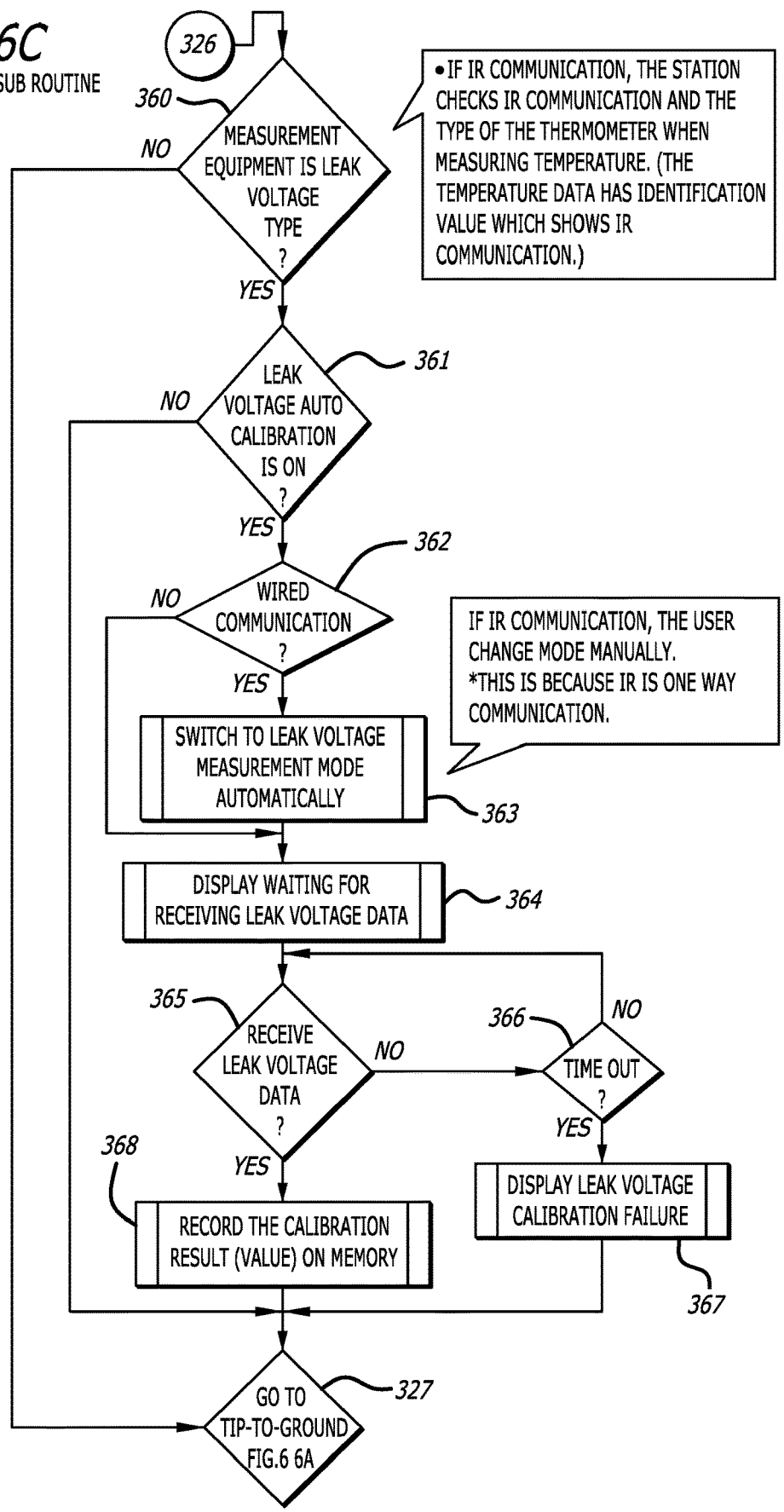
FIG. 6C depicts the steps for a basic program logic diagram to update an offset leak voltage for a cartridge.

FIG. 6C depicts the program logic steps for a program sub-routine to update an offset leak voltage data memory for a specific soldering cartridge. The sub-routine of FIG. 6C is launched when a user elects to initiate the sub-routine at step 326 of FIG. 6A. When the user launches the sub-routine at step 326 of FIG. 6A, the program advances to decision step 360 depicted at the top of FIG. 6C. At step 360, the program determines if it receives a data input from a measurement device that detects leak voltage. In effect, the program causes the control station to establish a communication link with the measurement device, such as a thermometer and/or a leak voltage detector. If at step 360 the program confirms that the measurement device can detect leak voltage, then the program advances to decision step 361. At step 361, the program determines whether the leak voltage auto calibration function is turned on. If the auto calibration function is turned on, then the program advances to decision step 362, to determine if the measurement device is connected via a wireless communication. If there is a wired communication link, then the program advances to step 363, switching the measurement device to a leak voltage measurement mode automatically. After step 363, the program advances to display step 364, where the program causes the control station to display a message advising the user that the control station is waiting to receive a leak voltage measurement, thereby prompting the user to conduct a leak voltage test activity. The program then advances to decision step 365, where the program determines if the control station has obtained leak voltage data from a leak voltage test. If no data measurement has been received, the program proceeds to step 366 and waits for a predetermined time out period of time to elapse without the program receiving leak voltage data. If after the completion of the time out period the program has not received updated leak voltage data, then the program advances to step 367, where the program causes the control station to display a leak voltage calibration failure message. However, if at step 366 the program does not reach the time out period before the occurrence of an activity such as the receipt of leak voltage data, then the program returns to the beginning of step 365. When at decision step 365 the program confirms that it has received leak voltage data, the program advances to step 368, the program causes the control station to record the leak voltage calibration result or data in the associated memory.

After step 368, as well as after step 367 or after a "no" determination at decision step 360 or 361, the program of the sub-routine advances to the tip to ground resistance sub-routine at block 327 of FIG. 6A.

FIG. 6D depicts the program logic steps for a program sub-routine to update the tip to ground resistance for a specific soldering cartridge. The sub-routine of FIG. 6D is launched when a user elects to initiate the sub-routine at step 327 of FIG. 6A, or at the completion of the sub-routine of FIG. 6C. When the user launches the sub-routine of FIG. 6D, the program advances to decision step 380 depicted at the top of FIG. 6D. At step 380, the program determines if it receives a data input from a measurement device that detects tip to ground resistance. In effect, the program causes the control station to establish a communication link with the tip to ground measurement device. If at step 380 the program confirms that the measurement device can detect tip to ground resistance, then the program advances to decision step 381. At step 381, the program determines whether the tip to ground resistance auto calibration function is turned on. If the auto calibration function is turned on, then the program advances to decision step 382, to determine if the tip to ground measurement device is connected via a wireless communication. If there is a wired communication link, then the program advances to step 383, switching the measurement device to a tip to ground resistance measurement mode automatically. After step 383, the program advances to display step 384, where the program causes the control station to display a message advising the user that the control station is waiting to receive a tip to ground resistance measurement, thereby prompting the user to conduct a tip to ground resistance activity.

The program then advances to decision step 385, where the program determines if the control station has obtained tip to ground resistance data from a tip to ground resistance test. If no data measurement has been received, the program proceeds to step 386 and waits for a predetermined time out period of time to elapse without the program receiving tip to ground resistance data. If after the completion of the time out period the program has not received updated tip to ground resistance data, then the program advances to step 387, where the program causes the control station to display a tip to ground resistance calibration failure message. However, if at step 386 the program does not reach the time out period before the occurrence of an activity such as the receipt of tip to ground resistance data, then the program returns to the beginning of step 385. When at decision step 385 the program confirms that it has received tip to ground resistance data, the program advances to step 388, the program causes the control station to display the auto calibration result. After step 388, the program advances to step 389, where the program records the tip to ground resistance calibration result or data in the associated memory. After the completion of step 389, the sub-routine ends, and the control program reverts to a soldering mode program.

The foregoing program descriptions are exemplary, and may be supplemented with subroutines to incorporate the additional functionalities of the thermometers 80 and the data components stored in the memory element 92.

Motion Sensor

The handle 24 of the system 10 depicted in FIG. 1 preferably includes an acceleration sensor 28. The acceleration sensor 28 is preferably a six axis acceleration sensor, which provides an acceleration data output signal to the control station reflecting any and all movements of the handle 24, and thus the cartridge 26. The control station 20 may use the data signal provided by the acceleration sensor 28 to monitor the activities and operator's use of the cartridge 26. Thus, if the control station does not receive any signal indicative of movement of the acceleration sensor 28 for a predetermined period of time, for example one minute, the control station 20 will determine that the tool is not being used, so it may be powered down or placed in a "sleep" mode to conserve power, or extend tip life. Alternatively, if the acceleration sensor 28 provides a signal indicative of a free fall of the handle 24, the control station 20 may immediately shut off power to the cartridge 26. As another alternative, the control station 20 may use the data provide by the acceleration sensor 28 to conclude that the user is cleaning the tip of the cartridge 26, as the movement of the acceleration sensor 28 is indicative of brush strokes across a cleaning pad as opposed to movements typical of a soldering operation.

Figure 7:
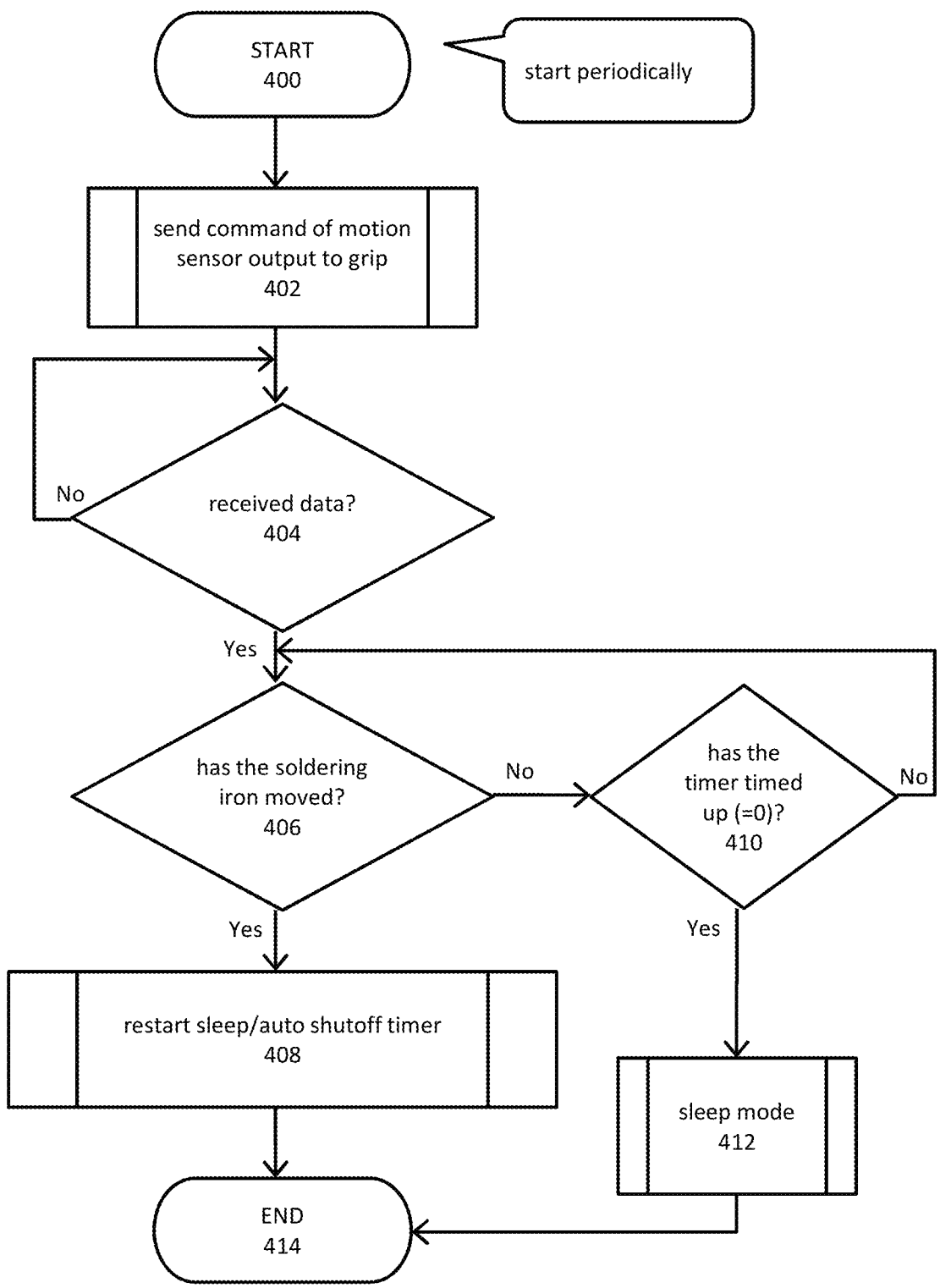
FIG. 7 depicts the steps for a basic program logic diagram for using the acceleration sensor data to control a sleep or shutoff mode.

FIG. 7 depicts the steps for a basic program logic diagram for using the acceleration sensor data to control a sleep or shutoff mode. The acceleration sensor program may be activated periodically whenever the control station 20 is on. Alternatively, the program may initiate whenever the control station has not received a data signal from the acceleration sensor 28 for a certain time interval, for example 30 seconds. The program initiates at the "start" step 400, and proceeds to step 402, where the control station sends a command query signal to the acceleration sensor 28 to provide an output signal confirming that the acceleration sensor 28 is operational. The program then proceeds to step 404 where the program determines if an operational signal has been received from the acceleration sensor 28. If no such signal is received, the program loops through step 404 until an operational signal is received, at which point the control program proceeds to step 406. At step 406, the control program monitors the acceleration sensor 28 for a signal indicative of movement of the handle 24. Upon receipt of a signal indicative of movement of the handle 24, the program proceeds to step 408, where the program restarts the sleep or automatic shutoff timer and then the program moves to the end step 414. However, if at step 406 the control station 20 does not receive a signal indicative of movement of the handle 24 for a predetermined length of time, for example 30 seconds or 60 seconds, then the program may proceed to step 410, where the determination is made as to whether a timer has timed out the predetermined length of time. If not, the system returns to step 406, if yes, the system determines that the soldering iron is not being used and the program proceeds to step 412, where a sleep or automatic shutdown function turns off power to the cartridge 26, assuming it is not being used because it is not moving. The program then proceeds from step 412 to step 414 if the system is not activated from the sleep mode in a predetermined period of time by the acceleration sensor 28, which may restart the power to the cartridge at step 406, otherwise the system remains in the sleep mode of step 412.

The foregoing program description is merely exemplary, and may be supplemented with subroutines to incorporate the additional functionalities of the acceleration sensor 28, for example, monitoring for any acceleration sensor signal equivalent to 9.8 meters per second per second (9.8 m/s²) reflecting free fall of the handle, and immediately shutting of power to the cartridge 26.

Internet of Things (IoT) Compatibility

The system 10 depicted in FIG. 1 includes the control station 20, gateway box 30 and host machine 40. As also depicted the system 10 may include sensor devices, including a bar code reader 82 and an RFID reader 84. The readers 82 and 84 may be used to scan or read bar codes or RFID tags on or inside of the soldering devices as well as those on the work pieces, for example a circuit board or electrical component or device that the operator is soldering. The work piece may have a unique serial number that may be read by one of the readers 82 and 84, with the serial number being reported by the reader to the control station 20 and to the host machine 40. The host machine 40, as well as the control station 20 if appropriate, can then maintain a record of the soldering events associated with the serial number of the work piece.

The gateway box 30 allows the interconnection of a number of individual control stations 20, to the host machine 40. As depicted, the gateway box 30 includes eight (8) communication ports allowing connection to eight control stations 20, 20-2, 20-3, 20-4, etc. With an increased number of control stations 20 reporting to the host machine 40, the host machine can collect a substantial amount of information from the control stations 20, the memory elements 92 in the cartridges 26 and the sensor devices.

Figure 8:
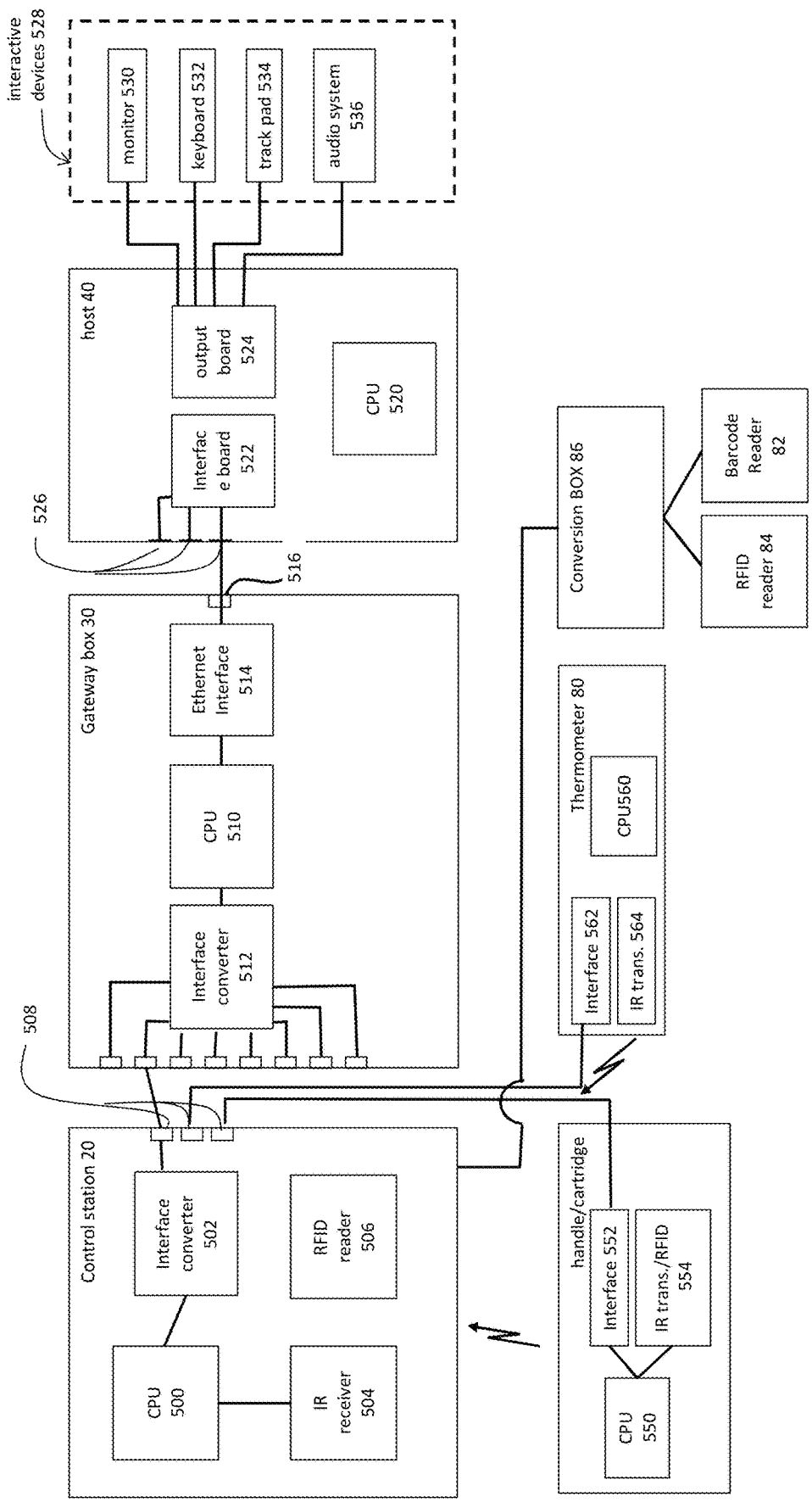
FIG. 8 is a schematic diagram of the system of the present invention depicting subcomponents of the system.

FIG. 8 provides a block diagram of the components of the system 10 and their main subcomponents providing communication within the system 10. As depicted, the control station 20 may include a central processing unit (CPU) 500, an interface converter 502, an infrared receiver 504, an RFID reader 506 and at least one communication port 508. The gateway box 30 includes a CPU 510 an interface converter 512, an Ethernet interface 514. The interface converter 512 is preferably configured to be connected to multiple communication ports 516, to allow connection to a number of control stations 20 as well as related soldering system devices, for example blowers, exhaust fans and de-soldering stations. The host machine 40 also includes a CPU 520 with an associated memory, interface boards 522, output boards 524, communication ports 526 and interactive devices 528, for example a monitor 530, keyboard 532, a mouse or track pad 534 and an audio system 536.

As depicted schematically in the block diagram of FIG. 8, the CPU 500 of the control station 20 may be interconnected to the CPU 510 of the gateway box 30 through the control stations' interface converter 502, communication port 508, a wiring harness or non-wired connection connecting the control station 20 to the communication port 516 and the interface converter 512 of the gateway box 30. The gateway box 30 processes the signals from a number of control stations 20 within the CPU 510, and then outputs data to the host machine 40 through the Ethernet interface 514, communication port 516 an Ethernet cable connected to a communication port 526 on the host 40, and the interface board 522 of the host 40. The interface board 522 is connected to the CPU 520, which processes the data from the control stations 20 and stores the data in its associated memory. The interactive devices 528 allow human operators to interact with the host machine, and thus the control stations 20.

As also schematically depicted in FIG. 8, the handle for the cartridge, or the cartridge itself, may include a CPU 550 connected to an interface 552 or an infrared transmitter 554, to allow communication to the control station 20, either through a hard-wired connection via the interface 552, or using the infrared transmitter 554 communicating with the infrared receiver 504 of the control station 20. The data communication between the handle for the cartridge, or the cartridge itself and control station 20 may alternatively use wireless communication methods other than infrared communication methods such as radio frequency identification (RFID) communication methods. Similarly, the thermometer 80 may include a CPU 560 and an interface 562 or an infrared transmitter 564, to allow communication to the control station 20, either through a hard-wired connection via the interface 562, or using the infrared transmitter 564 communicating with the infrared receiver 504 of the control station 20. The wireless communication of thermometer 80 may also use other types of wireless communication methods such as RFID methods.

The external to the control station, barcode reader 82 and the RFID reader 84 as well as a thermometer 80 are also depicted schematically in FIG. 8 as being connected to the control station 20 through a conversion box 86, although it should be appreciated that the conversion box 86 may be a board inside of the control station 20.

The schematic depiction of the system 10 in FIG. 8 illustrates the intercommunication capabilities of the system 10, and the communication of data concerning the soldering operations and components that may be supported by the system 10, interactive with the IoT. For example, when an operator begins working on a work or device that includes a barcode or RFID device, the operator can scan the work or device with the appropriate scanner 82 or 84, so that the control station 20 can identify the device and report to the host machine 40. If the host machine is programmed to anticipate that there will be eight soldering events for the work or device, the host machine 40 can output an alert to the operator, either directly or through the control station 20, to prompt the operator to scan the next work or device after each set of eight soldering tasks.

When the host machine 40 is provided with the data identifying the work or device to be soldered, the host machine 40 may provide an output to a monitor 530 at the workstation that guides the operator through the soldering steps required for the particular work. During the soldering operation, the control station 20 may record information concerning each soldering activity, and report the information to the host machine 40. For example, the control station 20 may identify eight soldering events, based on the load applied to the cartridge as discussed above, and confirm that each soldering event was successful. The control station 20 may also report the usage of a specific cartridge 26, identified for example by its bar code or RFID device, to the host machine 40, which records the data and provides an output instruction to the control station 20 to update the usage data in the memory element 92 of the cartridge 26. When the operator completes the soldering tasks on the work or device and scans the next work to be soldered, the host machine will have the data to confirm that the eight required soldering tasks were completed. If, during the soldering process on the subsequent work, the control station 20 provides data to the host machine 40 for only seven soldering tasks, the host machine may be programmed to alert the operator, for example by a screen prompt or audio prompt, to perform the eight soldering tasks. In addition, the host machine 40 may record the data for each of the soldering tasks associated with a particular work based upon its serial number, so that the soldering operations performed on the work may be recalled in the event of defects or service issues in subsequent testing or usage.

The communication capabilities for the control stations 20 and the host machine 40 may also be used to efficiently program the control stations 20 with information concerning the anticipated soldering tasks, the materials being used or soldered, and the cartridges. For example, at the beginning of a new project or production cycle, the host machine 40 may instruct each of the control stations to use a specific type of cartridge design and provide a specific set temperature as well as minimum and maximum operating temperatures for the cartridges 26, because of design constraints on the circuit of the work to be soldered. Also, the host machine 40 can maintain a record of the offset temperature requirement of each cartridge 26, for example based upon its serial number, so that if a cartridge is shared between work stations the respective control station 20 can receive an update for the offset temperature requirement of a specific cartridge even if the cartridge does not have a memory element. Also, the host machine 40 may be able to maintain and recall for use a record of the offset temperature requirement for a specific tip by receiving or recognizing the tip serial number or tip shape. Alternatively, the host machine 40 may advise the control station 20 that the amount of power required for a specific soldering task and a particular cartridge design should be in the range of five to ten joules. If the control station 20 or the host machine 40 subsequently identifies a power usage outside of that range during a soldering operation, the control station 20 may provide an alert to the operator indicating a defect in the soldering operation or the cartridge itself. The predetermined power usage is also beneficial in the training process, as it may be displayed on the control station, so that a new operator can see the progress of the soldering operation.

The IoT compatibility of the system 10, and the data managed by the host machine 40, may provide substantial benefits to the operator and the end users. For example, if the soldering data associated with each of the eight soldering tasks of the prior example are recorded to the host machine 40, the data may be recalled and reviewed in the event of a subsequent failure or defect for a specific device identified by its barcode or RFID device. For the facility in which the soldering stations are being used, the IoT compatibility of the system 10 may be used to monitor production speed for particular work stations or operators. This information may also be used to assist in training new operators by having efficient operators provide the training. Also, the host machine 40 may maintain information concerning the life cycles of various cartridges and identify when replacements should be ordered. As noted in the example above, the host machine 40 may efficiently update the number of control stations 20, to rewrite control parameters such as set temperature and temperature ranges, when work pieces have new demands, requirements, or restrictions. Because the host machine 40 may be connected to and receive data from the number of control stations 20, the host machine 40 may be programmed to identify control stations 20 that are operating inefficiently or improperly.

The IoT compatibility of the system 10, and the data managed by the host machine 40, may also provide substantial benefits to supplier of the system components. For example, if the host machine 40 may be connected to the internet, the host machine 40 could report the cartridge usage data, to the supplier of the system, providing feedback that may be useful in the manufacturing process and identifying cartridge replacement requirements. Also, software updates for the control stations 20 may be delivered to the host machine 40 using the internet, to efficiently implement the updates.

The invention has been described in detail above in connection with the figures, however it should be understood that the system may include other components and enable other functions. For example, intercommunication of the data between control station 20, gateway box 30, host machine 40, interactive devices 528, thermometers 80, and handle or cartridge in FIG. 8 can be either through hard-wired connections or wireless communication protocols. Those skilled in the art will appreciate that the foregoing disclosure is meant to be exemplary and specification and the figures are provided to explain the present invention, without intending to limit the potential modes of carrying out the present invention. The scope of the invention is defined only by the appended claims and equivalents thereto.

The invention claimed is:

1. A system for use in soldering operations, the system comprising:
    at least one control station including a central processing unit with an operating program and associated circuitry contained within a case having a display;
    a cable assembly having a proximal end configured to engage said control station and a distal end terminating in a handle for receiving cartridges, whereby said handle is connected to said control station by said cable assembly;
    at least one soldering cartridge removably inserted within and powered by said handle, said cartridge including a memory element storing information specific to the cartridge's use with leaded solder data that can be accessed by said central processing unit of said control station, wherein said control station displays a leaded solder notification when said memory element includes data indicating that said cartridge has been used with leaded solder.

2. The system of claim 1, wherein said memory element of said cartridge includes a fixed data memory having data fields for information specific to the cartridge including a cartridge serial number, cartridge tip shape data; and a variable data memory having data fields for information specific to the usage history of the cartridge selected from the group consisting of programmed set temperature data, temperature offset value data, applied load count data, totaled powered time data, total solder operations data, and use with leaded solder data.

3. The system of claim 1, wherein said handle includes an acceleration sensor, said acceleration sensor outputting acceleration data to said control station via said cable assembly, said control station including a program to utilize said acceleration data to monitor the non-use and movement of the cartridge, whereby if the control station does not receive any signal indicative of movement from said acceleration sensor for a predetermined period of time, the control station will determine that the cartridge is not being used and it may be powered down.

4. The system of claim 1, wherein said handle includes an acceleration sensor, said acceleration sensor outputting acceleration data to said control station via said cable assembly, said control station including a program to utilize said acceleration data to monitor the non-use and movement of the cartridge, whereby if the acceleration sensor provides acceleration data indicative of a free fall of said handle, said control station may immediately shut off power to the cartridge.

5. The system of claim 1, wherein said control station further comprises a program to monitor the power delivered to said cartridge and identify the completion of each soldering operation based upon the energy load experienced by said cartridge, said program further providing write instructions to said memory element to update one or more of the applied load count data, totaled powered time data and total solder operations data.

6. The system of claim 1, wherein said operating program of said control station outputs a cartridge use data instruction to be stored in said memory element of said cartridge upon completion of each solder operation.

7. The system of claim 1, further comprising a thermometer physically separate from and external to said cartridge, said thermometer configured to provide temperature data to said control station, said control station having a program to use said temperature data from said thermometer to calculate an offset temperature for said cartridge in said handle.

8. The system of claim 7, wherein when a temperature signal from said thermometer is out of range of an acceptable range of the temperature, the control station calculates an offset value.

9. The system of claim 8, wherein when said calculated offset value is within an acceptable range, the program instructs the control station to control the temperature based upon the calculated offset value.

10. The system of claim 1, further comprising at least one measuring device connected to said control station, said at least one measuring device selected from the group consisting of a thermometer, a tip to ground resistance device and a leak voltage detector.

11. The system of claim 1, wherein said operating program of said central processing unit of said control station further comprises an automatic temperature calibration sub-routine and temperature data record memory.

12. The system of claim 1, wherein said operating program of said central processing unit of said control station further comprises an automatic cartridge temperature calibration program.

13. The system of claim 1, wherein said operating program of said central processing unit of said control station further comprises a program sub-routine to update an offset temperature for a cartridge.

14. The system of claim 1, further comprising a leak voltage detector to provide leak voltage data to said control station, wherein said operating program of said central processing unit of said control station further comprises a program sub-routine to update an offset leak voltage data memory for a specific soldering cartridge.

15. The system of claim 1, further comprising a tip to ground resistance measurement device to provide tip to ground resistance data to said control station, wherein said operating program of said central processing unit of said control station further comprises a program sub-routine to update the tip to ground resistance for a specific soldering cartridge.

16. The system of claim 1, wherein said operating program of said central processing unit of said control station further comprises a program sub-routine for a cartridge tip management program.

17. The system of claim 1, wherein said operating program of said central processing unit of said control station further comprises a program sub-routine to set the lead solder and lead-free solder settings within the control station.

18. The system of claim 1, wherein said operating program of said central processing unit of said control station further comprises a program sub-routine to set or reset the lead solder and lead free solder for a soldering cartridge.

19. The system of claim 1, wherein said operating program of said central processing unit of said control station further comprises a program sub-routine to lock the control station operation program.

20. The system of claim 1, wherein the operating program records at least one of a temperature calibration and an offset result for said at least one cartridge to a memory in said control station.

21. A system for use in soldering operations, the system comprising:
at least one control station including a central processing unit with an operating program and associated circuitry contained within a case having a front panel, a display, control buttons and a socket;
a cable assembly having a proximal end configured to engage said socket of said control station and a distal end terminating in a handle for receiving cartridges, whereby said handle is connected to said control station by said cable assembly;
at least one soldering cartridge removably inserted within and powered by said handle, said cartridge including a memory element storing information specific to the cartridge that can be accessed by said central processing unit of said control station, said information specific to the cartridge stored in said memory element selected from the group consisting of a cartridge serial number, cartridge tip shape data, factory set temperature data, programmed set temperature data, temperature offset value data, applied load count data, totaled powered time data, total solder operations data, and the cartridge's use with leaded solder data, wherein said control station displays a lead solder notification when said memory element includes data indicating that said cartridge has been used with leaded solder.

22. A system for use in soldering operations, the system comprising:
at least one control station including a central processing unit with an operating program and associated circuitry contained within a case having a front panel, a display, control buttons and a socket;
a cable assembly having a proximal end configured to engage said socket of said control station and a distal end terminating in a handle for receiving cartridges, whereby said handle is connected to said control station by said cable assembly;
at least one soldering cartridge removably inserted within and powered by said handle, said cartridge including a memory element storing information specific to the cartridge that can be accessed by said central processing unit of said control station, said information specific to the cartridge stored in said memory element selected from the group consisting of a cartridge serial number, cartridge tip shape data, factory set temperature data, programmed set temperature data, temperature offset value data, applied load count data, totaled powered time data, total solder operations data, and the cartridge's use with leaded solder data, wherein said handle includes an acceleration sensor, said acceleration sensor outputting acceleration data to said control station via said cable assembly, said control station including a program to utilize said acceleration data to monitor the non-use and movement of the cartridge, whereby if acceleration data provided by the acceleration sensor is indicative of brush strokes as opposed to movements typical of a soldering operation, the control station will recognize a cleaning operation.

\* \* \* \* \*